United States Patent [19]

Reischl et al.

[11] Patent Number: 4,576,718
[45] Date of Patent: Mar. 18, 1986

[54] USE OF WATER-ABSORBING, HIGHLY-FILLED POLYURETHANE (UREA) COMPOSITIONS FOR BIOLOGICAL TREATMENT OF WASTE-CONTAINING LIQUIDS

[75] Inventors: Artur Reischl, Leverkusen; Kurt Mack, Wuppertal, both of Fed. Rep. of Germany

[73] Assignee: Bayer Aktiengesellschaft, Leverkusen, Fed. Rep. of Germany

[21] Appl. No.: 672,441

[22] Filed: Nov. 16, 1984

[30] Foreign Application Priority Data

Jan. 26, 1984 [DE] Fed. Rep. of Germany ....... 3402697

[51] Int. Cl.$^4$ ............................ C02F 3/06; C02F 3/08
[52] U.S. Cl. .................................. 210/616; 210/617; 210/151; 210/510.1; 521/159; 521/176; 435/182
[58] Field of Search ................................ 210/615–618, 210/150, 151, 500.1, 510.1; 435/262, 176, 177, 182; 521/159, 160, 54, 176, 905, 101, 102, 109.1

[56] References Cited

U.S. PATENT DOCUMENTS

| | | | |
|---|---|---|---|
| 3,779,906 | 12/1973 | Levin | 210/7 |
| 4,137,200 | 1/1979 | Wood et al. | 521/159 |
| 4,177,107 | 12/1979 | Kumakura et al. | 435/176 |
| 4,226,938 | 10/1980 | Yoshida et al. | 435/176 |
| 4,332,904 | 6/1982 | Kurane et al. | 210/618 |
| 4,342,834 | 8/1982 | Wood et al. | 435/176 |
| 4,415,454 | 11/1983 | Fuchs | 210/617 |
| 4,419,243 | 12/1983 | Atkinson et al. | 210/618 |
| 4,427,548 | 1/1984 | Quick, Jr. | 210/617 |
| 4,469,600 | 9/1984 | Frydman et al. | 210/617 |

FOREIGN PATENT DOCUMENTS

| | | |
|---|---|---|
| 248354 | 7/1966 | Austria . |
| 0017888 | 8/1980 | European Pat. Off. . |
| 46901 | 8/1981 | European Pat. Off. . |
| 77411 | 10/1981 | European Pat. Off. . |
| 2550818 | 5/1977 | Fed. Rep. of Germany . |
| 2839872 | 3/1980 | Fed. Rep. of Germany . |
| 2929872 | 3/1981 | Fed. Rep. of Germany . |

(List continued on next page.)

OTHER PUBLICATIONS

Adsorptive Abwasserreinigung, 3rd Report, Oct. 1975, published by the Water and Sewage Committee VCIev.
K. Fischer et al., Auswirkungen der Biologischen Besiedlung auf die Adsorption von Aktivkohle und auf Deren Anwendung in der Weitergehenden Abwasserreinigung, *GWF-Wasser/Abwasser*, vol. 2, (1981), pp. 58–64.

(List continued on next page.)

*Primary Examiner*—Benoît Castel
*Attorney, Agent, or Firm*—Gene Harsh; Joseph C. Gil

[57] ABSTRACT

The present invention relates to the use of non-floating, non-abrasive, highly-filled polyurethane (urea) compositions of high water-absorbability, which during their production contain no cells capable of growth as carriers for biomasses in the biological treatment of waste-containing liquids. These carriers have a filler content of greater than 15% by weight and less than 95% by weight (based on the moisture-free weight of the filler-containing polyurethanes). The fillers are selected from the group consisting of natural materials containing finely-divided fossil lignocelluloses or the secondary products thereof (e.g., peat, lignite, mineral coal or coke), active carbon, finely-divided distillation residues, inorganic fillers, homogeneous or cellular plastics particles (and more particularly polyurethane foam (waste) particles) and mixtures thereof. The polyurethane (urea) is a hydrophilic and/or hydrophobic polyurethane(urea), and preferably contains cationic groups. These highly-filled, polyurethane (urea) carriers have a water-absorbability exceeding 33% by weight of water in the swollen carrier.

These carriers allow improved treatment of industrial and municipal liquid waste to be achieved in biologically-operating treatment plants. Treated waste which has reduced toxicity, a diminished smell, improved clarity and a very small residual content of organic, decomposable material is obtained due to the increased decomposition effect thereof.

15 Claims, 4 Drawing Figures

FOREIGN PATENT DOCUMENTS

| | | |
|---|---|---|
| 3025353 | 1/1982 | Fed. Rep. of Germany . |
| 1313348 | 4/1973 | United Kingdom . |
| 1390058 | 4/1975 | United Kingdom . |
| 1579623 | 11/1980 | United Kingdom . |

OTHER PUBLICATIONS

A. E. Perrotti et al, Enhancement of Biological Waste Treatment by Activated Carbon, *Chemical Engineering Progress*, (CEP), vol. 69 (11) (1973), pp. 63–64.

G. Wysocki et al, Abwasserreinigung Durch das Katox-Fallungs-Verfahren, *CZ-Chemie-Technik*, 3 (6) (1974), pp. 205–208.

W. Hegemann et al, Belebungsverfahren mit Schaumstoffkorpern zur Aufkonzentrierung von Biomasse, *GWF-Wasser/Abwasser*, 124, vol. 5 (1983) pp. 233–239.

A. Tanaka et al, Entrapment of Microbial Cells and Organelles with Hydrophilic Urethane Prepolymers, *European Journal of Applied Microbiology and Biotechnology*, 7 (1979) pp. 351–354.

USE OF WATER-ABSORBING, HIGHLY-FILLED POLYURETHANE (UREA) COMPOSITIONS FOR BIOLOGICAL TREATMENT OF WASTE-CONTAINING LIQUIDS

BACKGROUND OF THE INVENTION

The organic constituents of waste-containing liquids are decomposed by microorganisms by an essentially biological method in treatment plants. There is a microbic increase in the biomass which substantially consists of bacteria with extensive assimilation (i.e., transformation of the organic impurities) in so-called activated sludge tanks under the conditions prevailing therein. After conventional processes have been carried out, the residual content of dissolved, organic sewage constituents is still too high in many cases and does not fulfill the tight regulations regarding the purity of water. Consequently, for many years, numerous attempts have been made and improvements in processes have been sought, to further reduce the content of residual organic sewage constituents. For instance, the throughput in activated sludge tanks (which contain from about 500 to 30,000 m$^3$) was increased, the concentration of biomasses and oxygen was raised and, in some cases, additional activating tanks were connected in series with the optional use of trickling filter technology. Additional gassing (increased oxygen supply) of the activated sludge was also tested. Moreover, various specific oxidation processes were developed, such as an ozone or hydrogen peroxide treatment.

Furthermore, the catalytic oxidation of the sewage constituents using air and with addition of active carbon in conjunction with subsequent precipitation was recommended (c.f., for example, German Pat. No. 22 39 406; German Offenlegungsschrift No. 30 25 353; A. Bauer et al., Chemie-Technik, Volume 6, pages 3–9 (1982); K. Fischer et al., GWF-Wasser/Abwasser, Volume 2, pages 58–64 (1981): R. E. Perrotti et al., Chemical Engineering Progress (CEP), Vol. 69 (11), 63–64 (1973); G. Wysocki et al., ZC-Chemie-Technik, 3 (6), 205–208 (1974), and 3rd Report "Absorptive Abwassereinigung" (October 1975) published by the Water and Sewage Committee VCIev).

The above-mentioned processes proved to be too complicated or too expensive on an industrial scale. In some cases, the decomposition effect was still unsatisfactory. Numerous attempts to use active carbon in the water treatment industry have failed in the past (despite the improved decomposition effect thereof) because the active carbon, even in its bound (granulated) form is crushed and discharged in too high a quantity even in the very slow currents which are required in settling tanks. Attempts to obtain a sufficiently effective large quantity and to thoroughly bind the active carbon while still maintaining the bioactivity in the settling tank have as yet been unsuccessful.

German Offenlegungsschrift No. 30 32 882 (corresponding to European Patent Application No. 46,900) and German Offenlegungsschrift No. 30 32 869 (corresponding to European Patent Application No. 46,901) describe the use of a macroporous material which has a low specific weight (10–200 kg/m$^3$) as a carrier material for nitrifying bacteria in activated sludge treatment. These macroporous materials include, for example, polyurethane foams. Similarly, foam particles in a process and an apparatus for anaerobic biological sewage treatment are described. With regard to the improved results achieved, see for example, GWF-Wasser/Abwasser, 124 (1983), Volume 5, 233–239. However, foams of this type float in activated sludge tanks and disturb the process in various ways. Lump foams which are, for example, based on polyurethane have also been recommended in various, specific processes as bulk filling (German Pat. No. 28 39 872 and German Auslegungsschrift No. 2 550 818) or as trickling compositions (Austrian Pat. No. 248 354) for biological sewage treatment.

European Patent Application 77 411 describes the use of polyurethane foam lumps as filtration medium, the impurity content of which is washed away from time to time by specific flushing processes to regenerate the foam.

The combination of surface-active solids with microorganisms to increase the activity thereof in bioconversion processes is also known. German Offenlegungsschriften No. 26 33 259 and German Offenlegungsschriften No. 27 03 834, for example, describe the adsorption of cells on aluminum oxide, bentonites and SiO$_2$ and the subsequent incorporation thereof into polyacrylates. Furthermore, German Offenlegungsschrift No. 26 29 692 describes the intercalation of cells into photo-hardenable polyurethanes containing photo-hardenable acrylate double bonds.

The incorporation of cells capable of growth into polyurethane hydrogels is also known, [C.F. for example, Tanaka et al., European Journal of Applied Microbiology and Biotechnology, 7, (1979), from page 351]. German Offenlegungsschrift No. 29 29 872 also describes a process for the production of hydrophilic, gel-like or foamed biocatalysts with a high charge of enzyme-active substance by polymeric inclusion of complete cells, of cell fragments or enzymes, by mixing an aqueous suspension of the enzyme-active substance with hydrophilic polyisocyanates to form a highly enzyme-active hydrophilic polyurethane network in block or bead form. Further publications pertaining to the prior art are noted on page 7 of the above-mentioned Offenlegungsschrift.

The production of polyurethanes which contain enzymatically active substances is difficult and suffers from the disadvantage that it destroys, at least partially, bacteria and cells or deactivates enzymatically active material due to the high reactivity of the isocyanate groups. Residual activities of only 7 to 48%, for example, are shown in the examples of German Offenlegungsschrift No. 29 29 872. It is not desirable to incorporate living bacteria into hydrophilic polyurethanes during production and to use them, for example in treating sewage. The incorporated quantity of bacteria of this type is limited. A significant proportion of the bacteria is also deactivated by the isocyanate reaction. Furthermore, the continuous production of active, bacteria-containing polyurethane compositions and their "activating storage" involves production and storage problems in supplying the treatment tanks which usually contain several thousand cubic meters, with the necessary quantity and concentration of bacteria incorporated in polymers. There would be a drastic reduction in the growth capability of the bacteria even if they were directly incorporated into the treatment plant due to the short survival time when immobilized in the reaction medium.

Consequently, a solution was still sought to the problem of developing new, economical and effective processes for improved sewage treatment.

Thus an object of the present invention is to provide water-absorbing, non-floating, highly-filled polyurethane(urea) compositions which can act as carriers for biomasses in the biological treatment of waste-containing liquids. Such carriers should be accessible and easily producible. Such carrier compositions should not float in the treatment plants, but should remain readily separable. The carriers should be non-abrasive even with respect to added fillers, such as active carbon, common sand and lignite dust, and should represent such a good carrier medium for the colonization of bacteria for decomposing organic materials in the liquids to be treated that there is a greatly improved treatment effect. Treated water of high quality should thereby be obtained.

DESCRIPTION OF THE INVENTION

Figure 1:
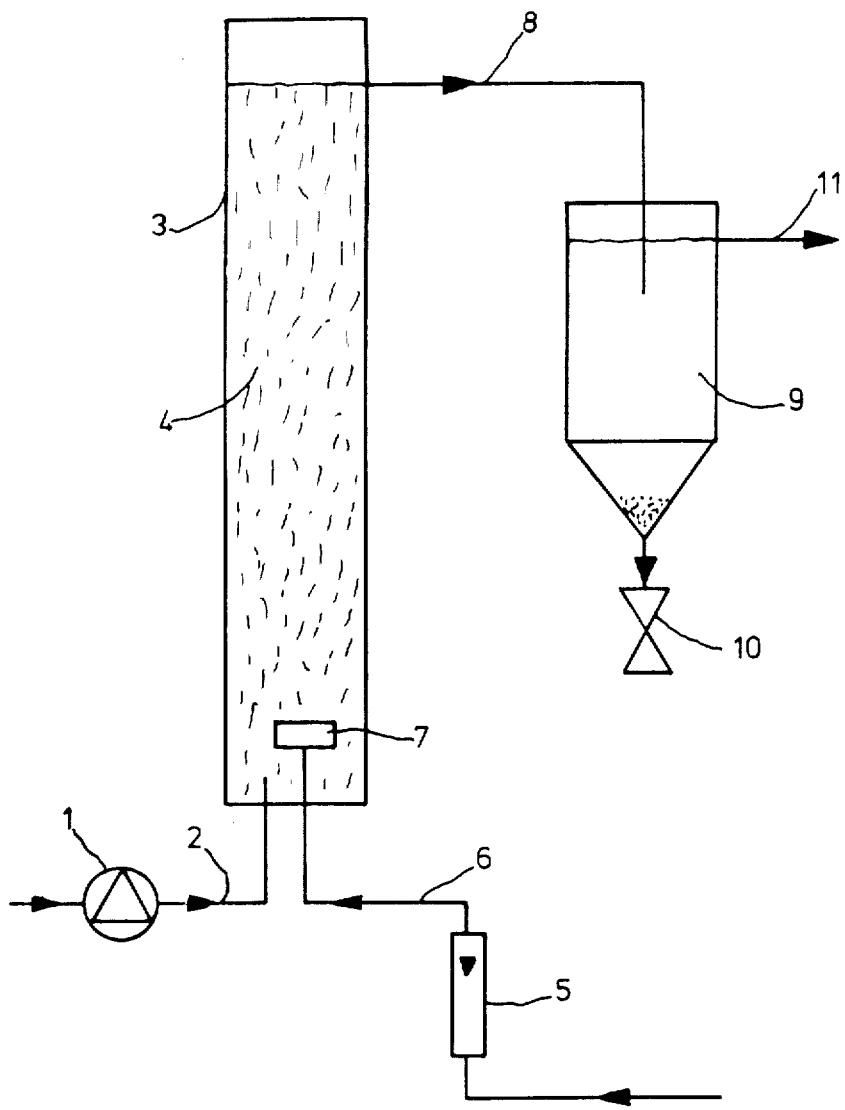
FIGS. 1 and 2 represents two embodiments for using the carriers of the present invention.

It has now surprisingly been found that the decomposition effect in waste treatment in biologically operating treatment plants can be substantially improved by using water-absorbing polyurethane(urea) compositions which are highly filled with specific materials, in a quantity of at least 0.5 grams, preferably greater than 10 grams and most preferably, greater than 30 grams based on dry composition per liter of water-containing liquids, up to a maximum limit which is characterized by complete volumetric filling with the swollen polyurethane(urea) masses, as carriers on and/or in which bacteria can grow in biologically operating treatment plants.

Thus, the present invention provides for the use of polyurethane(urea) as carriers for biomasses for biological treatment, characterized in that the carrier is a non-floating, non-abrasive, highly-filled polyurethane(urea) composition of high water absorbability, containing no cells capable of growth during its production. The polyurethane(urea) has a filler content of greater than 15% by weight, preferably 20% or more by weight, and most preferably 40% or more by weight, and an upper limit of 95% by weight, preferably 90% or less by weight, and more preferably 85% or less by weight, based on the moisture-free content of the filler-containing polyurethane(urea). The fillers are selected from the group consisting of natural materials containing finely-divided fossil lignocelluloses or the secondary products thereof (such as peat, lignite, mineral coal, coke or charcoal, preferably black peat and/or lignite and most preferably lignite dust), active carbon, cork powder, finely-divided organic distillation residues which melt above 100° C. (in particular distillation residues from toluylene diisocyanate distillation), inorganic finely-divided fillers (in particular iron oxides, pyrogenic silicas, quartz, pumice stone, common sand, silica sols, water glass, aluminum oxide, or aluminum silicates, bentonites or chalk as well as gypsum), homogeneous or cellular plastics particles which are based on polymerization, polycondensation and/or polyaddition (in particular flexible or rigid polyurethane foam particles) and mixtures thereof. The polyurethane (urea) is a hydrophilic and/or hydrophobic polyurethane(urea), preferably containing cationic groups or groups forming cationic groups. The cationic groups or groups capable of forming cationic groups are preferably present in a quantity of from 10 to 3,000 milliequivalents, and more preferably from 50 to 1,000 milliequivalents per kg of polyurethane(urea). The carriers of the present invention have a water absorbability [which is caused by hydrophilic polyurethane(urea)s and/or by hydrophilic fillers], of greater than 33% by weight of water, preferably 50 to 97% by weight of water, based on water-swollen, filler containing polyurethane(urea) carrier. The carrier is used in a quantity of at least 0.5 gram per liter of the liquid to be treated.

The filler is an important constituent of the polyurethane(urea) compositions which are suspended in the waste-containing liquid as carriers having high water absorbability. The unexpectedly high decomposition effect which is caused by the use of the claimed carriers is believed to be due to the interaction between the filler and the polyurethane (urea) composition. Sufficient water absorbing matter must be introduced into the carriers either by the polyurethanes (for example in the form of hydrophilic polyurethane compositions) and/or by hydrophilic fillers (for example, lignite or black peat) for them to possess the above-mentioned water absorbability.

In a preferred embodiment, the fillers consist of natural materials which contain fossil lignocelluloses or the secondary products thereof, such as peat or lignite, or less preferred mineral coal, finely-ground coke or charcoal. Mineral coal, coke or charcoal, however, is preferably only used as a mixing component to form further fillers. Due to its hydrophilic properties, peat, in particular as a pre-dried, crushed natural product, (preferably with a residual water content of less than 20% by weight, preferably less than 15% by weight, and most preferably less than 10% by weight, and possibly dried to values close to 0%), in various states of ageing such as for example, white or preferably black peat, and, in particular, lignite, are preferred. Lignite dust, for example, with approximate percentage contents of about 68% of C., 5.3% of H, 25.7% of O, and 1.0% of N, based on dry substance, represents a particularly advantageous hydrophilic or water absorbing filler and is particularly preferred as a filler according to the invention. Most preferred is a combination of lignite with polyurethane foam particles. Peat and lignite are capable of binding large quantities of water without feeling wet; for example, 150% or more water, based on lignite or peat dry substance.

Suitable fillers also include active carbons, cork powder and finely divided, organic distillation residues which melt above 100° C. Preferred distillation residues are those from toluylene diisocyanate (TDI) distillation which are obtained, for example, by introducing the distillation residues into water with denaturation and subsequent granulation. These TDI residues may also be modified by treatment with compounds bearing reactive hydrogens such as ammonia, polyols or polyamide compounds. In many cases, such residues also carry small quantities of NCO groups or reactive conversion products of isocyanates which are capable of reacting with the biomasses or compounds to be decomposed. Distillation residues of this type are known and are described, for example, in German Offenlegungsschriften Nos. 28 46 814, 28 46 809 and 28 46 815. Further suitable distillation residues include high-melting distillation residues of amines, phenols, caprolactam and the like.

Homogeneous or cellular plastics of various types and, in particular, polyurethane foam particles or rigid and semi-rigid polyurethane foam granulates are also suitable as preferred fillers. These foams are embedded or encased in the polyurethane(urea) matrix in such a way that at least some of the cavities (or in other cases almost all cavities) are filled by the binding polyurethane(urea) matrix causing substantial compactions of the material and preventing these carriers from floating.

Moreover, the use of defective batches of plastics or plastic waste as fillers is particularly important from an economical view point. Homogeneous plastics are used after being crushed to less than 3 mm or finer, whereas cellular plastics, (in particular the flexible polyurethane foam waste which is produced in enormous quantities) can be used in the form of an economically obtainable, irregular, lumped granulate with edges ranging from 1 mm to several cm in length. Foam waste can also be used, a mixture of various foam bulk densities as a filler, while binding with the polyurethane(urea) compositions to produce the carriers.

Carriers containing combinations of fossil lignocelluloses, in particular lignite dust and/or black peat and polyurethane foam particles (preferably flexible polyurethane foam or foam waste particles) are particularly preferred.

The inorganic fillers such as quartz, common sand, pyrogenic silica (aerosil), silicates, aluminosilicates, bentonites, aluminum oxide, pumice stone, silica sols, water glass, calcium oxide, calcium carbonate, barite, gypsum, and in particular finely-divided iron-II- and/or iron-III-oxides (in pigment form or as magnetite sludge) are preferably added in addition to the fossil and/or foam fillers in proportions to permit a certain control of the specific weight of the carriers so that they sink or are suspended in the liquid to be treated but do not float on it. In particular, finely-divided inorganic fillers (for example, with primary particles below 10 $\mu$m and a high surface area such as aerosil or iron oxides) promote the transfer of oxygen to the treatment sludge bacteria when present in the carriers of the invention and thus promote better decomposition yields or decomposition effects. Metal oxides obviously effect particularly desirable specific oxygen transfer functions and thus produce desirable decomposition effects according to the invention. Inorganic fibers (such as glass fibers) or natural or synthetic fibers (such as cotton dust) can also be used as modifying filler additives.

The grain size of the fillers generally lies between 0.5 and 1000 $\mu$m, preferably below 300 $\mu$m, and more preferably below 100 $\mu$m. Smaller grain sizes are preferred, in particular for active carbon and inorganic constituents and for mineral coal dust or charcoal dust. In the case of peat or lignite dust, peat and lignite may have fibrous contents. The restriction in grain size does not apply to foam particles which are to be used as fillers. In this case, foam pieces which are optionally several mm (for example 1 to 30 mm, preferably 2 to 10 mm) or polyurethane foam films which are about 2 to 10 mm thick may be embedded in the polyurethane(urea) composition.

The total filler content should be higher than 15% by weight, preferably more than 20% by weight, and more preferably more than 40% by weight. The upper limit is at about 95% by weight, preferably less than 85% by weight and more preferably less than 80% by weight.

The filler contents are calculated in % by weight, based on the moisture-free weight of the filled polyurethane(urea) compositions. The upper limit is generally determined by the cohesion and the abrasion-resistance of the highly filled polyurethane(urea) compositions. In individual cases, it is possible to even further increase the filler content over 95%, for example up to 97%, if the biological treatment is carried out in a fixed bed arrangement.

The fillers can be incorporated into the polyurethane(urea) matrix in various ways. For instance, they can be mixed with one of the starting materials or with the prepolymeric products (preferably the NCO prepolymers) or the OH-functional higher molecular polyols optionally pre-extended with polyisocyanates, and the polyurethane-forming reaction can subsequently be carried out with this mixture. However, the fillers are preferably first wetted with water or dispersed in water and bound by the NCO-prepolymers by addition thereof, the build up of the polyurethane(urea) (in particular using water as chain lengthener) taking place simultaneously. When using ionic NCO prepolymers, brief mixing with some of the proposed quantity of water (for example in a throughflow mixer or static mixer) to produce a very finely-divided emulsion is preferred. This permits immediate wetting even of markedly pre-dried fossil celluloses with the total quantity of water so that the isocyanate reaction can take place in an optimum distribution.

The production of the highly-filled polyurethane(urea) compositions which are capable of swelling markedly in water and which are used according to the invention as carriers will be described below by way of explanation mainly by reference to preferred compositions and a preferred structural make up. Several factors and the interaction thereof are of importance. The starting components for polyurethane formation, the quantitative relationship thereof and the methods of production as well as the type of fillers are aspects which must be carefully adapted to each other so that the goal of producing polyurethane (urea) carrier compositions of the specified type (containing large quantities of fillers but having high water absorbing properties in the end product) is achieved. The water absorbing properties can be introduced by means of hydrophilic polyurethane(urea) and/or by hydrophilic fillers. The carriers should have a water absorbability value (WAF) of at least 33% by weight of water, preferably 50 to about 97% by weight of water, and most preferably 75 to 95% by weight of water, based on water-swollen, filler-containing polyurethane(urea) carriers in suspension (see method of measurement described in the examples). This means, for example, that with a water uptake of 33%, half the quantity by weight of water, based on the quantity by weight of filler-containing carrier composition dry substance, is absorbed or that with a water uptake of 80%, four times the quantity of water is absorbed or with a water uptake of 95%, nearly twenty times the quantity of water in the filler containing polyurethane(urea) carrier composition dry substance is absorbed or is located between the carrier particles.

Hydrophilic polyurethane(ureas) are preferred as binding matrix for the fillers. The polyisocyanates may but preferably do not have hydrophilic properties.

Polyhydroxyl compounds which are preferably used as higher molecular polyols have molecular weights preferably above 400, and functionalities of approximately 2.2 to 3.5. Preferred are polyhydroxy polyethers of mixtures thereof with lower molecular weight polyols. Polyethers are preferred over polyesters, polycarbonates or polylactones which are theoretically equally usable as they are substantially more stable to hydrolysis than the polyhydroxyl compounds containing ester groups even in their long term behavior.

Polyoxyalkylene ethers which have a greater number, for example, more than 20% by weight preferably more than 30% by weight and particularly more than 40% by weight, and less than 85% by weight of oxyethylene units are particularly suitable for the synthesis of hydrophilic polyurethanes. The oxyethylene groups may be incorporated into the polyethers in a terminal, statistically distributed or preferably segment-like manner, or even in a terminal and segment-like manner (in the interior thereof). The polyalkylene ethers may, however, also contain small quantities of, for example, cycloaliphatic or aromatic groups, such as if they are prepared from cycloaliphatic polyols or aromatic compounds, such as dihydroxy cyclohexanes or hydroquinone-bis-hydroxyethyl ethers or 4,4'-dihydroxydiphenyl-dimethyl-methane. Suitable polyols may also be synthesized by alkoxylation of relatively high functional sucrose alcohols or sucroses.

Chain lengthening agents having molecular weights of up to 399 and preferably up to 254 may also be used. Examples include di- and/or polyols or amino alcohols, such as ethylene glycol; 1,2-propylene glycol; 1,4-butane diol; 2,3-butane diol; neopentylglycol; 2-methylpropane diol-1,3; hexane diol-1,6; dodecane diol-1,12; the relatively hydrophilic, di-, tri-, tetra- and higher molecular weight polyethylene glycols which have molecular weights of up to 399; di-, tri- and tetrapropylene glycol-diols or di-, tri- and tetraoxymethylene diols; bis-hydroxyethyl-amine: bis-2-hydroxypropyl amine; amino sucrose; 2-amino-propane diol-1,3; and the like. Polyamines are preferably only used as chain lengthening agents together with other low molecular weight polyols or water. The chain lengthening agent which is most preferred is water, and it functions not only as a chain lengthening agent but also as a swelling agent for the carriers.

The di- and polyfunctional polyisocyanates are preferably used as polyisocyanates. Examples include hexane diisocyanate; dicyclohexyl methane diisocyanate: isophorone diisocyanate: and the like. Preferred are aromatic di- and polyisocyanates, such as the toluylene diisocyanate isomers, diphenyl methane-4,4'- and/or 2,4'- and/or 2,2'- isomers, and the relatively high molecular weight polyphenyl polymethylene polyisocyanates, as are produced by the phosgenation of crude formaldehyde-/aniline condensation products (polyamine mixtures) which can be used as undistilled sump products. Sulphone group-containing polyisocyanates may also be used.

Conventional polyurethane catalysts, such as tertiary amines, metal catalysts or tin catalysts may be used as catalysts, but in many cases this is not necessary.

The hydrophilic polyurethanes are generally more or less gel-like, swollen, (optionally foamed) forms with a damp feel when hydrophilic polyols are used. They may be produced, in principle, by any known process and from starting components as are described in the following: German Offenlegungsschrift No. 23 47 299, German Pat. No. 25 21 277, German Pat. No. 25 21 265, German Offenlegungsschrift No. 31 03 500, German Offenlegungsschrift No. 31 03 564 and German Offenlegungsschrift No. 31 51 925.

The highly-filled polyurethane(urea) compositions which are synthesized from hydrophobic polyols and polyisocyanates have a substantially or completely dry feel and are surprisingly, as intensively "hydrophilic" with regard to the water absorbability (WAF value) thereof (particularly when peat or lignite is used) as the above-mentioned hydrophilic gels. They are also extremely straightforward to produce and are particularly resistant to year-long use in treatment plants. Such hydrophobic polyurethanes are therefore highly preferred, especially with peat or lignite (dust) as fillers and possibly together with polyurethane-foam particles, and where the hydrophobic polyurethanes used have built in cationic groups or cation-forming groups.

The use of hydrophilic and/or hydrophobic starting components with cationic groups or cationic-forming groups is particularly preferred in the synthesis of the polyurethane(ureas). Quaternary or salt-like ammonium groups, and sulphonium or phosphonium groups may, in principle, be used as cationic groups. The use of compounds which have quaternary ammonium groups or tertiary amino groups which are subsequently converted into the form of ammonium (salt) is preferred, The quantity of cationic groups and cation-forming groups respectively is from 10 to 3000 milliequivalents of cations and cation-forming compounds respectively to 1000 parts by weight of polyurethane(urea) matrix. When quaternized compounds or compounds which have been converted into the form of salt are used, the upper limit is generally 1000 milliequivalents per 1000 g of polyurethane(urea). Otherwise too high a viscosity would occur during the reaction. From 30 to 1500 milliequivalents of cationic or cation-forming groups are preferred and from 50 to 750 milliequivalents of cationic or cation-forming groups per 1000 grams of polyurethane(urea) are most preferably incorporated. Tertiary amino group-containing di- or polyols are preferably used as cation-forming compounds. Examples include N-methyldi(ethanol) amine or -(propanol) amine, N,N-di-methyl-amino-methyl propane diol-1,3; bis-hydroxyethylpiperazine: higher functional compounds, such as triethanol amine: and relatively high molecular weight compounds, such as polyoxyalkylene ether, which are started on the above-mentioned tertiary amine-polyols. Further incorporable tertiary amine compounds are, for example, listed in German Pat. No. 34 61 102 or in the Austrian Pat. No. 257170. Quaternized compounds, such as tetramethyl ammonium chloride or tetramethyl ammonium methyl sulphonate may also be used as incorporable constituents. It suffices from time to time to incorporate compounds which produce tertiary amine end groups into the compounds, such as N,N'-dimethyl amino ethanol. If cationically-modified polyurethanes of this type containing peat and/or lignite (dust) are used, the otherwise water-soluble constituents of lignite or peat, namely the humic acids and other acidic, soluble compounds are surprisingly quantitatively fixed. Thus if large quantities of peat and/or lignite are used as filler in the carriers, a colorless, completely transparent aqueous phase is obtained when introduced into water. The use of peat or lignite was hitherto prevented in treatment plants because of the serious disadvantage that the water was colored brown by the dissolution of substantial quantities of directly soluble constituents or constituents which colloidally go into solution in water at a pH of from 5 to 9, such as humic acids or the precursors thereof. If lignite or peat alone were used according to the state of the art as the carrier substance in treatment plants this would cause a marked clouding of the water and create an increased chemical oxygen demand (CSB-value) due to the dissolved constituents.

A method using isocyanate prepolymers is especially suitable for the production of cationic or cation-forming polyurethane(urea) compositions, which prepolymers contain cationic groups incorporated therein or have a group which is capable of forming cations, such as tertiary bound nitrogen. Phosphoric salts may also be extracted to form the salt, which salts may be necessary growth constituents for the bacteria of the sewage sludge. In many cases, however, the salts may be formed simply from the humic acids or other acidic constituents from the sewage sludge so that the cations then only form in the treatment tank.

Cationic, aqueous polyurethane or polyacrylate or polyamide dispersions may also be added or used in the case of peat and/or lignite containing polyurethane compositions. If cationic dispersions are added, the complete absorption thereof into highly-filled polyurethane(urea) composition is generally only possible in relatively small quantities—when such large quantities are added, some of it is usually washed away again into the water. The subsequent application of aqueous, cationic dispersions to the non-ionic, highly-filled polyurethane(urea) carrier material is possible, albeit less preferred, because in this form such dispersions often act as flocculants for sewage sludge. The admixture of these cation-active polymer additives by mixture before the isocyanate reactions in the aqueous phase, such as reaction of the NCO prepolymer with water to produce the polyurethane (urea) is more advantageous.

Anion groups (such as sulphonate groups) may be present up to, or preferably below the cation equivalents, in the polymer or as (polymeric) additives with the formation of ampholyte systems, in addition to the cation groups. An excess of anions with respect to the cation groups should be avoided especially when lignite or peat is used.

The addition of cationic (and anionic) polymers to the polyurethane(urea) carriers is not preferred. It is mostly preferred to use polyurethane(urea) which contain built in cationic or cation forming groups, especially when peat or lignite and polyurethane-foam particles are used as fillers.

The cation groups in the highly-filled polyurethane(urea) compositions not only exert a favorable influence on binding the above-mentioned, fossil natural materials, but also favorably influence the activity of the activated sludge bacteria and surprisingly also the abrasion-resistance of any additional fillers. Moreover, the ion charges ensure a finely-dispersed distribution (or even solution) of the isocyanate compounds in the quantities of water which are used (a type of emulsifier effect) so that undesirable coagulation of the polyurethane does not occur. In fact, the particles of filler are very evenly covered.

It has also surprisingly been found that inorganic fillers, such as quartz, common sand or pounce are bound in a substantially more non-abrasive manner by the cationic polyurethanes and there are no traces of sedimentation of the inorganic fillers during polyurethane(urea) formation. The inorganic fillers are generally added to control the specific weight of the carrier compositions, in order that the carriers do not float during the treatment stages. Extremely finely-divided, inorganic fillers (from 0.1 to 10 m) additionally increase the specific surface of the carrier compositions. Iron oxides are capable of favorably influencing the transfer of oxygen to the bacteria. The inorganic fillers are generally only used in addition to the other fillers, and preferably in addition to lignite and/or peat and/or polyurethane foam particles.

A preferred method of producing the carrier compositions is by using NCO-prepolymers, which are produced from hydrophobic and/or hydrophilic polyhydroxyl compounds (and, preferably ethylene oxide group-containing polyethers), optionally chain lengthening agents and excess polyisocyanates. The reaction to produce polyurethane(urea) is due to the reaction of the isocyanate groups with the excess quantities of water. The water may contain smaller quantities of di- or polyamines. The fillers are preferably first suspended, preferably in the excess aqueous phase or by wetting the fillers with the excess of water which is provided. The NCO-prepolymer is subsequently metered to the water/filler mixture.

All the constituents are added virtually simultaneously or several seconds after each other and intensively mixed in suitable, continuously operating mixing apparatus, such as a double blade-spiral trough. The isocyanate reactions thereby begin immediately. The reaction rate may be influenced in known manner using catalysts and/or by using elevated temperatures. To initiate the isocyanate reaction, a temperature of from 10° to 90° C. and preferably from 20° to 70° C. is chosen. In many cases room temperature is very suitable. After intensive mixing of all reaction constituents, the reaction temperature may be raised to about 90° C.

Water is not only necessary, as explained above, as a reaction constituent for the polyisocyanate compounds, but it also acts as a dispersing agent, in relatively large excess quantities whether hydrophilic or hydrophobic isocyanate compounds are used. The resulting product is characterized by a high water absorbability and water-retention capacity, high filler content, good abrasion resistance, year-long resistance and insolubility in treatment water, and a tendency to sink or at least the capability to be suspended in sewage sludge tanks (that is a non-floating characteristic). A maximum water absorbing nature is achieved either by using highly hydrophilic constituents to produce a hydrophilic polyurethane (urea) gel or by using large amounts of water-absorbing fillers. A polyurethane(urea) which is too strongly hydrophilic is generally not sufficiently stable, with regards to long-term storage in water, and is not non-abrasive in a fluidized bed.

The high water absorbability of the carriers which are used according to the present invention can be achieved in various ways as noted earlier. As a general rule, hydrophilic polyurethane(ureas) may combine with hydrophilic and hydrophobic fillers, whereas hydrophobic polyurethanes must be combined in general with hydrophilic fillers, such as peat or lignite, to attain the required water absorbability of the carriers. The water absorbability is generally increased by the incorporation of polyurethane foam particles.

The quantity of water which is present during the reaction with the NCO-prepolymers and fillers is of great significance. If relatively small quantities of water excess are used, such as 20 parts of water to 80 parts of hydrophobic NCO prepolymers plus filler, a finely-powdered (or crumbly), insufficiently hydrophilic (and thus, unsuitable) product which has a high rate of washout is obtained. Only with a markedly higher quantity of water does the hydrophobic NCO-prepolymer bind the fillers to produce a non-abrasive, water-absorbing carrier having the properties which are required according to the present invention.

The requisite water content may generally fluctuate between 33% by weight and 97% by weight and preferably between 50% by weight and 95% by weight, based on water-swollen, filler-containing polyurethane (urea). The proper amount of water for any combination of filler and polyurethane(urea) can generally be determined by conducting small scale experiments. Thus, preliminary samples weighing from about 30 g to 300 g of suitable highly-filled polyurethane(urea) carriers (which are produced by systematically varying the type and quantity of the isocyanate constituents and fillers) in the presence of variable, but always large excess quantities of water in small preliminary experiments, are subjected to a test in water-filled columns, having, for example, a diameter of from 10 to 20 cm, through which air is allowed to flow upwards through a frit or a finely perforated die plate. Over a period of 24 hours the abrasion, tendency to sink, color and transparency of the aqueous phase may be easily determined using the completely swollen carrier composition. The presence and metering of excess quantities of water is, as explained important in producing the carrier material for the intended use of the polyurethane(ureas) as carriers in biologically operating treatment plants. It is possible according to this test to select the right reaction constituents and quantities from the large number of reaction constituents and fillers which are known and conventional in polyurethane chemistry by observing the characteristic influences thereof, and thus to produce the filled polyurethane(urea) carriers which have the characteristic properties and which are used according to the present invention. It is preferred to produce them either discontinuously or continuously, using at least 30% of an NCO-prepolymer (as opposed to producing them 100% from known, low molecular polyisocyanates and a relatively high molecular weight and optionally low molecular weight, at least bivalent hydrogen-active compounds.

As explained above coarse, foam-like plastic materials, and in particular polyurethane foam particles may be bound as fillers with polyurethane (ureas) as a matrix to produce suitable carriers.

The use of flexible foams which are based on polyurethane as carriers in biological processes for the treatment of sewage is known and described in the prior art. It has been found that high-expansion foams which have a conventional bulk density of from 15 to 35 kg/m$^3$, as are commercially available as waste foam, cannot be successfully used as the sole carrier material in sewage sludge tanks. Foams of this type always float, cause blockages and are not used due to other negative characteristics of the behavior thereof in treatment plants. Polyurethane-flexible foams which have a relatively high density of about 90 kg/m$^3$ are somewhat more favorable, but even after months (c.f. comparative exampes) are found in large quantities floating on the surface of the treatment tanks. Depending on the layer thickness of the foams, they cause the outlet to be blocked or are even carried out with the efflux. Floating foams of this type are substantially ineffective for the biomass and cause many insurmountable technical difficulties. The addition of active carbon to the foams does not produce any advantages, even if it has been previously crushed into the foam (c.f. Comparative Example).

Materials of this type are however used according to the present invention as fillers in the polyurethane(urea) matrix. Polyurethane-flexible foams or semi-rigid polyurethane foams are preferably used in lump-form, whereas rigid brittle polyurethane particles are preferably used in powder form, as they have a much more unfavorable behavior in lump form. Furthermore, despite being bound in the polyurethane (urea) matrix, such rigid foams may be crushed and are thus often not sufficiently non-abrasive. Waste flexible foam flakes having a density of less than 23 kg/m$^3$ are exceptionally suitable as fillers for the carriers for growing biomasses. The cavities of the foams are virtually completely or at least partially filled during binding with the polyurethane(urea) matrix. Thus, the bulk density and mechanical strength increases substantially so that the foam flakes no longer float and are stable under the effects of mechanical influences.

According to one preferred embodiment of the present invention, finely-divided peat and in particular lignite dusts are used in addition to the foam particles as filler particles and polyurethanes which are cationically modified are used as the matrix. These carriers may also contain proportional quantities (preferably less than 10% by weight) of inorganic fillers, such as aerosil or iron oxides, as additional fillers.

The polyurethane foam wastes may be used as filler in a form which is inexpensive to obtain (i.e., irregular granulated material having an edge of 1 mm to several cm). The polyurethane foam, as all the other fillers, is generally reacted in large excess quantities of water with the isocyanate compounds. NCO-prepolymers of the above-mentioned constituents, and, under certain conditions, the polyisocyanates themselves, and in particular higher functional sump products of polyphenyl-1-polymethylene-polyisocyanate or TDI-containing residual products are generally used as isocyanate compounds. The quantity of water which is used is normally several times, and often from 10 to 15 times that of the foam weight. The filler which is most often and most preferably used, such as lignite dust, is surprisingly evenly divided in simple mixing apparatus and distributed onto and into foam cells and with the aid of the isocyanate reactions, is bound in a non-abrasive manner in the water-swollen polyurethane phase. In the highly-filled polyurethane(urea) compositions which thus result, the polyurethaneflexible foam-waste particles which may be used as filler and have an average bulk density of only 23 kg/m$^3$ are completely changed in the original structure and physical property thereof. A sufficient quantity of water may be bound in the cavities of the foam (which may be partially-filled). It is thus possible to use (flexible) lumps of foam as filler in combination with hydrophobic and hydrophilic polyurethane reaction constituents (preferably NCO-preadducts) and preferably with additional water absorbing fillers (lignite). An advantageous structure is formed by the interaction of hydrophilic (or water absorbing) fillers (preferably peat or lignite) and the physically bound quantities of water, on which structure a bacteria growth may be produced in the remaining cavities of the modified foams. Inorganic fillers in a finely-divided form may be used to regulate the specific gravity of these highly-filled polyurethane(urea) compositions. The necessary specific weight for the treatment liquids may thereby be adjusted and the transfer of oxygen to the bacteria may be encouraged.

Conventional, non-hydrophilic, relatively high molecular weight polyhydroxyl compounds having a molecular weight of from 400 to about 10,000, optionally low molecular weight chain lengthening agents and polyisocyanates as are generally known for production of polyurethane and as are described, by way of example in German Offenlegungsschrift No. 28 32 253, may be used as hydrophobic reaction constituents to produce a "hydrophobic" polyurethane(urea) matrix. In this instance, relatively high molecular weight, "hydrophobic" polyhydroxyl compounds are preferably polyethers which have been produced by addition of, for example, propylene oxide on polyfunctional starters and do not contain any noteworthy quantities of hydrophilically-acting ethylene oxide segments (i.e., less than 20% by weight).

Water is preferably used as a chain lengthening agent and excess dispersing and swelling agent to react the hydrophilic or the hydrophobic polyurethane-forming constituents.

A hydrophobic polyurethane(urea)-matrix (in quantities of 5-95% by weight of solid carrier substance) in combination with hydrophilic fillers (preferably peat and/or lignite and/or foam particles) is especially preferred, since it is easily produced and shows excellent mechanical stability.

Polyurethanes which at least partially have a hydrophilic character (such as by the ion content or as by the oxyethylene group content thereof) are also preferred as a matrix. As has been explained above, the polyurethanes are preferably slightly cationically modified, and in particular preferred fillers based on peat and in particular lignite and/or based on inorganic fillers are used. A particularly preferred composition is one where the polyurethane(urea) contains less than 30% by weight of oxyethylene groups in the polyol component used to produce said compositions, and the filler is selected from the group consisting of peat, lignite, polyurethane foam particles and mixtures thereof.

In the production of the highly-filled polyurethane(ureas) the numerous variants of shaping are determined by the process technology of the treatment plants which operate in very different manners. Regular or irregular lumps of "granulated material" are obtained by conventional cutting or granulating techniques thereby forming block, strand or ribbon-shaped products. In some cases, the highly-filled polyurethane(ureas) are suspended in film-forming or wound in a spiral-shape. In these cases, textile backings can be used to stabilize particularly large surfaces.

In the most inexpensive and most straight-forward embodiment of the biological sewage treatment, carriers are used in the form of an irregular granulated material of from 0.1 to 10 cm, and preferably from 1 to 5 cm in size. To this end, the substantially or completely reacted, highly-filled polyurethane(urea) in prefabricated strand, block or band form is crushed with conventional choppers or cutting granulators to the appropriate lump size. Fine grains which may be produced may be isolated and separated during washing.

If foam particles and additional fillers are used, the isocyanate reactions are carried out in kneaders or in mixing apparatus which are equipped with propeller blade-like tools, so that subsequent crushing is no longer necessary.

The water-swollen, carriers according to the present invention are generally flexible, elastic, non-abrasive particles which have a more or less wet or even dry feel, and which may be suspended in water and slowly sink therein It was not thought that the polyurethane(urea) compositions which are highly-filled with fillers, such as active carbon or lignite, could be produced in a sufficiently non-abrasive manner as carriers with extremely high water absorbing properties in a homogeneous structure would have such favorable influence on the biological treatment, even though the fillers of an active type, such as black peat and lignite, are embedded in the polyurethane composition and the biomass of the bacteria is firstly located in the outer, coherent aqueous phase, and only grows there from outside.

The carriers which are used according to the present invention are suitable for most, conventional processes for biological, aerobic or anaerobic, treatment of sewage, both in industrial and in municipal treatment plants.

The biological-conversion of organic impurities using bacteria with the supply of oxygen in bacteria masses which substantially consist of carbohydrates and proteins in $CO_2$ and water, and optionally nitrates and nitrogen, is defined as aerobic sewage treatment.

The conversion of organic impurities, preferably carbohydrates, protein and fats without the supply of oxygen using acid-forming bacteria, sulphatereducing bacteria and methane-producing bacteria with the formation of hydrogen sulphide, carbon dioxide and in particular methane, is defined as anaerobic sewage treatment.

The highly-filled, polyurethane compositions which are used as carriers according to the present invention give rise to improved biological treatment of sewage both in a stagnant and in the preferred moving stage. More surprisingly, also sewaqe which has a very low concentration of harmful substances, for example below 500 mg/l, can be effectively treated by the carriers of the present invention, as to produce clean water.

The sewage treatment according to the present invention may be carried out in the first and/or in consecutive activating stages, by supplying the carriers at a suitable point in one or more combined activated sludge tanks. Since the polyurethane(urea) compositions according to the present invention are to a large extent abrasion-resistant in water, they may be used in treatment tanks which have great turbulence as well as in containers which do not have or have only very little moving sewage sludge. Thus, the highly-filled polyurethane(urea) compositions may be used in suitable fluidized bed or fixed bed arrangements.

The introduction of air and/or (pure) oxygen causes considerable turbulence in aerobic treatment processes which are operated on a large scale. In a so-called liquid fluidized bed, the highly-filled polyurethane compositions and the activated sludge is thereby briskly kept moving. Nevertheless, on the surface and partially also inside the highly-filled polyurethane a layer of bacteria is formed which achieves a surprisingly high treatment capacity. The filler which is incorporated in the polyurethane has in many respects an advantageous influence on the improved process. Depending on the type of filler and type of polyurethane(urea) matrix, the mechanical strength and the water absorbing nature of the polyurethane are improved. Additionally, the bioactive assimilation capacity of the organic materials which are dissolved in the sewage are substantially increased. The filler or the filler mixture which is bound in the polyurethane(urea) also acts as a control for maintaining optimum, specific gravities for the carriers of the present invention, so that it is possible that the carriers which have a weak tendency to sink or to remain in a suspended state will be uniformly distributed in conventional highly filled activated sewage tanks which often are from about 4 to 12 m deep. This is extremely important or is even a procedural prerequisite for most biologically-operating treatment plants which are operated by towns or industry.

In contrast, as explained above, conventional, foam-like plastic materials (including polyurethane foams) which have a microporous structure and have not been modified according to the present invention are not as effective in operating treatment plants and cannot be used continuously over several years since these foams (even when they have a relatively high bulk density of about 90 kg/m$^3$) float in large quantities on the surface of the treatment tanks and thus cause technical difficulties (e.g. blockages). The use of foams which have a conventionally low bulk density of from 20 to 35 kg/m$^3$ (so-called waste foam mixtures) has proved to be impossible. These foams float on the surface of the water even with intensive stirring.

As explained above, in a specific embodiment of the present invention, the polyurethane(urea) compositions with fillers and optionally additives are adjusted in such a way that they sink immediately or after several hours in the activating tank of the treatment plant. Despite the throughflow of sufficient air and oxygen, the carrier materials (which contain a substantial quantity of adhering biomass after a certain time) form a fluidized bed or a fixed bed through which an oxygen-containing gas flows with an underlying substantially polyurethane-free layer of water. If necessary, such as for the occasional or continuous discharge of excess sludge intensive gassing may be applied. The highly-filled polyurethane(urea) compositions which are used according to the present invention are not even discharged during this intensive gassing.

Anaerobic sewage treatment is of great commercial importance in addition to the widely-used aerobic biological treatment of sewage, particularly in sewage which contains a large quantity of carbohydrate and in particular in the food industry. In many cases the combined anaerobic and aerobic biological treatment of sewage is particularly effective. The highly-filled polyurethane(urea) carriers according to the present invention may also be advantageously used in this instance.

The degree of water absorbency of the highly-filled polyurethane(urea) compositions is preferably adjusted in such a way that there is a high water absorption over a period of hours or a few days with intensive swelling or that a larger quantity of water is already present during production of the polyurethane compositions as a dispersed phase (thus, the carriers are already completely swollen). In the anaerobic treatment technique and in aerobic sewage treatment, larger quantities of gas-like products, such as carbonic acid, methane or hydrogen sulphide may easily escape through the products of the present invention.

The "in situ" incorporation of microorganisms into polyurethanes or other plastics materials is, as already explained, virtually impossible with the biomasses which are used for sewage treatment, even under very careful and technically expensive conditions, without the loss of bacteria which are capable of propagating and a marked reduction in bioactivity. According to the present treatment process, it is also unnecessary as a large quantity of the bacteria cultures finds a solid hold in the fully reacted, highly-filled polyurethane(urea) carriers surprisingly even in the fluidized bed and can even penetrate into the highly-filled, heavily swellable, polyurethane(urea) compositions and thereby be protected from mechanical damage. The bacteria are located at the same place where the highly filled polyurethane(ureas) cause an increased concentration of dissolved harmful substances by absorption at the solid particles.

The decomposition capacity and the treatment effect improves the quality of sewage, by a marked reduction in the chemical oxygen demand (COD values), and encourages a drastic reduction in the toxicity to water-fleas and fish. The nasty smell which is produced in many treatment plants is to a large extent prevented and the color of the treated sewage is also markedly lightened. Moreover, the capacity of an existing biological treatment plant may also be markedly increased.

The highly-filled polyurethane(urea) compositions of the present invention improve the treatment capacity of biological treatment plants in two very different ways. Thus, the constituents of sewage are not only concentrated on the surface of the carriers, but what is more important, specific substances of the sewage may be enriched. The concentration of compounds of this type is thus raised to a value which is necessary for biological decomposition. Simultaneously microorganisms establish themselves on the highly-filled carriers and propagate in an optimum manner due to the available substrate which has been enriched Adsorption surfaces for the organic compounds (small concentrations of which are contained in the sewage) are released again after conversion by bacteria. The stages of adsorption and utilization of the dissolved sewage constituents on the carriers, on which the microorganisms have grown, are continuously taking place. A state of equilibrium is formed between adsorption and enrichment of the substances which have dissolved in the water and the biological decomposition by the microorganisms which have also established themselves on the surface of the carriers. In this manner a continuous regeneration of the surface is achieved. An equilibrium is also formed as a function of the available substrate between the biomass-growth on the highly-filled polyurethane(urea) compositions and the dissolution of the substances, so that there is continuously an increased biomass-activity on the carriers.

It is possible to at least double the concentration of the activated sludge in biological treatment plants using the carriers according to the present invention, so that the capacity of existing treatment plants is substantially increased or so that smaller basin capacities suffice in new plants.

A straightforward commercial use of the carriers consists in adding them to a conventional, biological activating tank. The carrier particles are kept suspended by the flow of gas/liquid and are distributed in a uniform manner in the activating area. The highly-filled polyurethane carriers may also easily be used in activating tanks which are equipped with surface-ventilators due to the extremely high abrasion-resistance thereof. The carriers are particularly effective if used in the nitrification and denitrification of sewage, as the microorganisms which are necessary for this grow slowly, preferably on the surface of the carrier.

These plants may be operated as fluidized bed-reactors or as fixed bed-reactors in the aerobic field of sewage treatment. The flow in the fixed bed may be from below upwards or from above downwards. They may also be operated as trickling filters. Highly-filled polyurethane compositions may also advantageously be used as a growth surface (immersion percolating filter) due to the particularly large surface thereof.

These are several possibilities for using the highly-filled carrier compositions of the present invention in the field of sewage treatment with an increased decomposition capacity and a drastically shortened residence period of the water which contains harmful substances in the treatment plants. The plants may be operated in a moving or fluidized bed and in a fixed bed. If the fixed bed is chosen, the highly-filled polyurethane compositions may be used as granulated material or as solid baffles, such as for example in the form of rolled mats or prefabricated inserts. In this instance the flow in the fixed bed may be from below upwards and vice versa. The method is generally dependent on the structure and nature of the sewage.

By following the present invention, as shown in detail in the Examples, even conventional biologically pre-treated sewage may effectively be further freed of harmful substances which contain a relatively large quantity of organic-residues which are difficult to decompose, and cannot be decomposed by microorganisms in a conventional biological plant due to the dilution level of the slow propagation thereof and the risk of their being washed out using other materials as carriers.

The carriers according to the present invention may also be used to treat waste air by drawing it once or more than once by suction or bringing it into contact with moist or wet or water-suspended highly-filled polyurethane(urea) carriers.

The carrier compositions which are used according to the present invention can easily be disposed of, due to the inert character thereof. In treatment plants where the excess activated sludge is burned in a fluidized furnace, the carrier compositions may be discharged with the excess activated sludge and burned as fuel after they have been used for several years. It is not generally necessary to exchange the total carrier material.

The invention is further illustrated but is not intended to be limited by the following examples in which all parts and percentages are by weight unless otherwise specified.

EXAMPLES (A) Production of the carrier compositions
(A1) Production of the NCO-prepolymers The NCO-prepolymers are produced in known manner in a mixing apparatus by heating the starting constituents noted in Table 1 for about 2 or 3 hours at a temperature of from preferably about 70° to 90° C. until the calculated NCO-content is reached.

TABLE 1

Composition and characterization of the NCO—prepolymers (PP) in Examples 1 to 21.

| Type | Viscosity mPas/25° C. | % NCO | Isocyanate Quantity | Isocyanate Type | Polyetherpolyol Quantity | Polyetherpolyol Type | NM | DMS | IQU |
|---|---|---|---|---|---|---|---|---|---|
| KI-PP-A | 12,500 | 5.1 | 16.6 | TDI | 80.4 | PHILV | 1.5 | 1.5 | 120 |
| KIO-PP-B | 64,000 | 5.3 | 19.1 | TDI | 57.1 19.0 | PHILV PHOBL | 2.4 | 2.4 | 200 |
| KI-PP-C | 11,200 | 5.6 | 18.5 | TDI | 79.1 | PHILV | 2.4 | 2.4 | 200 |
| I-PP-D | 56,000 | 4.9 | 22.4 | D44R | 77.6 | PHILV | — | — | |
| KO-PP-E | 9,500 | 5.9 | 20.0 | TDI | 41.9 35.0 | PHOBV PHOBL | 1.5 | 1.5 | 120 |
| KO-PP-F | 12,200 | 3.2 | 14.1 | TDI | 45.9 38.4 | PHOBV PHOBL | 0.8 | 0.8 | 60 |
| (K)O-PP-G | 15,600 | 5.7 | 20.6 | TDI | 76.3 | PHOBV | 3.1 | 3.1 | 260 |
| O-PP-H | 7,800 | 3.3 | 11.9 | TDI | 88.1 | PHOBV | — | — | — |

Type = characterization of the NCO—prepolymers (PP) (the last letter, i.e., A through H represents the designation for the prepolymer)
K = cationic
(K) = Basic with tertiary nitrogen, capable of forming cations
I = hydrophilic
O = hydrophobic
(Quantity in parts by weight)

The quantities given in Table 1 are parts by weight. The materials used in the Examples were as follows:

Isocyanates:
TDI=tolyulene diisocyanate-2,4-, -2,6-isomer mixture (80:20 wt ratio)
D 44 R=distillation residue from the production of 4,4'-diphenylmethane diisocyanate, containing quantities of relatively high molecular weight polyphenyl-polymethylenepolyisocyanates, NCO-content 29.8% by weight.

Polyetherpolyols:
PHILV=hydrophilic, branched polyether, derived from trimethylol propane, reacted with 40 parts of propylene oxide and 60 parts of ethylene oxide, OH-number 26
PHOBV=hydrophobic, branched polyether, derived from trimethylol propane, reacted with 80 parts of propylene oxide and subsequently 20 parts of ethylene oxide, OH-number 28.
PHOBL=hydrophobic, linear polyether from 1,4-butanediol and propylene oxide, OH-number 56.

Compounds having a tertiary nitrogen:
NM=N-methyl-diethanolamine

Quanternizing agent:
DMS=dimethylsulphate
PPS=85% pure polyphosphoric acid.

Ionification data:
IQU=cation equivalent or tertiary nitrogen equivalent (cation-forming group) in milliequivalents per 100 g of NCO-prepolymer.

(A2) Reaction of the NCO-prepolymers to produce the carrier compositions

The filler is suspended or wetted in the given quantity of water and the NCO-prepolymer is rapidly and intensively stirred in at room temperature. If a hydrophilic NCO-prepolymer is used, the reaction mixture hardens at room temperature after a few minutes (such as from 1 to 3 minutes). If hydrophobic NCO-prepolymers are used, the reaction mixtures hardens after from 1 to 2 hours. The reaction time can be shortened to several minutes by addition of from 0.1 to 0.5% by weight of catalyst, based on the quantity of prepolymer, and/or by using hot water (about 80° C.).

If the cations have not yet been formed in the prepolymer (for example by quaternization), the calculated quantity of acids (preferably phosphoric acid) is added to the aqueous filler suspension to form the amine salt. If lignite or peat is used as a filler, the humic acids which are contained therein are used to form the salt with the formation of polyurethane-humates.

The carrier compositions according to the present invention (which are produced in this manner and can be crushed in conventional cutting granulators) settle out completely at various speeds of rapidity in the treatment water depending on the composition.

(B) The use of the carrier compositions in a biological treatment process (B1) Characterization of the biological sewage treatment process which is used I. Description of a continuously operating fixed bed/-fluidized bed apparatus (FIG. 1)

In this instance, the process in the fixed bed apparatus is designated as process (Ia) and the process in the fluidized bed apparatus is designated as process (Ib).

A partial flow of sewage from a first activating stage of an industrial large-scale plant having $COD_5$ (chemical oxygen demand) values of $350 \pm 100$ mg/l and $BOD_5$-values of $23 \pm 5$ mg/l is continuously pumped by pump (1) via conduit (2) into column (3). The column is filled with the carrier material (4), as explained in the Examples, on which the activated sludge biomass is to establish itself.

The gas which is required for gassing and supplying the column with oxygen is supplied to the column (3) through the rotameter (5) via the conduit (6) by a frit or an apertured plate (7). By supplying large quantities of oxygen-containing gas, the column may be operated as a fluidized bed and if only a small quantity of gas is supplied it may be operated as a fixed bed. The oxygen-containing gas emerges from the frit or aperture plate (7) in the form of small bubbles and flows through the column (3). The sewage which is supplied via the conduit (2) also flows through column (3) on the filling of which (4) a biological layer is formed within a few days, if the carrier materials according to the present invention are used, and subsequently emerges from the column (3) via outlet (8). The sewage which has been treated is introduced via conduit (8) into clarifying agent (9) after an average period of residence of 4 hours. Particles of the biological layer which have been rinsed from the column (3) separate in the clarifying agent (9) and may be drawn off via the isolating valve(10). The treated sewage leaves the clarifying agent (9) via the outlet conduit (11).

Figure 2:
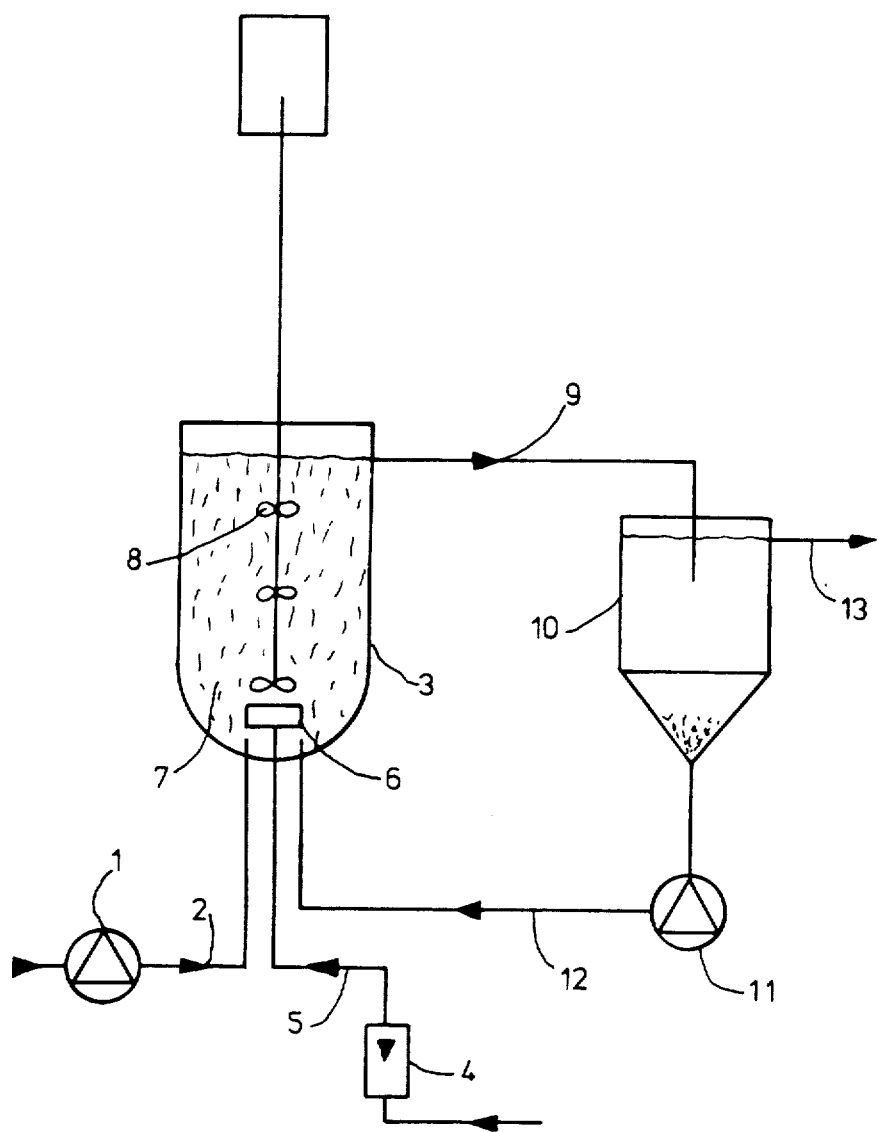

II. Description of a continuously-operating mixing apparatus (FIG. 2)

A partial stream of sewage from a first activating stage of an industrial large-scale plant ($COD_5$ from 300 to 400 mg/l, $BOD_5$ from 18 to 27 mg/l) is continuously pumped by pump (1) via conduit (2) into the container (3). Oxygen-containing gas is supplied to the container (3) via the rotameter (4) and the conduit (5) by the frit (6). The sewage which is to be treated and the carrier material (7), on which the bacteria are to grow, are kept moving by the stirrer (8), so that a uniform distribution of the carrier material and the activated sludge is guaranteed. The gas which emerges through the frit (6) in small bubbles is distributed by the stirrer (8) in the container, and it is thereby possible to adequately supply the contents of the container with oxygen.

The treated sewage which overflows from the container (3) is passed through conduit (9) into the clarifying agent (10).

Activated sludge (7) which has been rinsed from the container (3), and settles in the clarifying agent (10), may be led back into the container (3) by pump (11) via conduit (12) or taken out of the system. The treated sewage leaves the clarifying agent (10) via conduit (13).

The continuous treatment operation in the above-mentioned mixing apparatus is designated as treatment process II in the Examples. The average residence period is 4 hours.

EXAMPLE 1

1.1 Carrier material:

67.7 parts by weight of native lignite from the Aachen lignite district having 52% residual moisture, which has been crushed to produce particles of less than 200 μm and is thus in the form of lignite dust, are stirred in 35.2 parts by weight of water and, as described in Example A2, with 7.5 parts by weight of the cationic NCO-prepolymer KI-PP-A (5.1% by weight of NCO). A carrier material in the form of a water-swollen, slightly elastic solid material which has a moist feel is produced which is granulated into lumps of less than 12 mm in size. The solid cationic polyurethane(urea) carrier material which is filled with lignite contains 32.5 g of lignite-dry substance in 40 g of carrier composition which is assumed to be moisture-free (consisting of lignite which is calculated to be moisture free and polyurethanes which are assumed to be moisture-free), producing 81.25% by weight of lignite, based on the dry composition of the filled polyurethane(urea) carrier.

The resulting, granulated carrier material is then mixed with excess water for 24 hours (at room temperature), completely swollen and the water over it decanted. The value which is derived and gives the quantity in percent by weight of water in and between the swollen carrier (filler-containing polyurethane(urea)), is designated as the water absorbability (WAF).

The solids content of the aqueous suspension of granulated material produced in this manner in the form of a carrier material which is now intensively swollen, is 140 g of solid material per liter of "suspension" (without overlying water) in this Example. The solids content in one liter of a suspension of this type (without overlying water) is designated as the dry substance of the suspension (abbreviated to TS−S). (Value determined by drying in vacuo).

The weight of one liter of this suspension of intensively swollen carrier material (without overlying water) is designated as the suspension weight (abbreviated to SG).

The value of the so-called suspension factor (F4) is determined from the suspension weight (SG) and the dry substance of the suspension (TS−S) which is contained therein. The value of the suspension factor (F4) minus 1 (F4-1) gives the quantity of water (based on the dry substance of the carrier) in the total suspension (in the form of swelling water and as water in the cavities in or between the particles of carrier).

The value of the suspension factor F4 is determined in practice by first determining the dry substance of the suspension. The suspension weight (SG) is divided by the dry substance of the suspension (TS−S) which is contained therein:

$$F4 = TS - SG/S.$$

The water absorbability (WAF) may be determined as a characteristic for the carrier compositions to be used according to the present invention from this value by the following formula:

$$WAF = \frac{F4 \text{ minus } 1}{F4} \times 100; \text{ (in } \% \text{ per weight)}$$

This value of water absorbability (WAF), expressed as a percentage, gives a meaningful picture of the state of the highly-swollen carrier compositions as are used in a swollen state in the treatment plant. In Example 1.1 the dry substance of the suspension, in the absence of overlying water, amounts to 140 g of solids if the suspension weight is 1013 g per liter of suspension, the suspension factor F4 is calculated to be 1013/140=7.236. Thus, one part by weight of dry substance of carrier composition is converted into the above-described swollen form or suspended form using 6.236 times the quantity of water. In other words, the water absorbability value is 6.236 divided by 7.236 times 100=86.2%.

To further characterize the carrier compositions, the apparent densities (in g/l) are determined under the following conditions:

S1. Apparent density, drained off:

The carrier composition is suspended for 24 hours in a large excess quantity of water, and subsequently a screen having a 2 mm mesh is filled to 10 cm deep with this swollen mass which is allowed to drain for 1 hour; the material retained on the screen is subsequently weighed in a measuring vessel and the apparent density per liter is calculated.

S2. Apparent density, crushed out:

The carrier composition which was drained off according to S1 is subjected to a pressure of 3 bars on a 1 mm screen for 5 minutes and is subsequently weighed in a measuring vessel. The apparent density S2 per liter is then calculated.

S3. Apparent density, dried:

The wet, crushed carrier composition according to S2 is dried for (about) 1 day at 110° C. under vacuum until the weight thereof is constant and is weighed in a measuring vessel. The apparent density S3 per liter is then calculated.

In the above-mentioned Example, the values thus determined of S1 to S3 are:
S1 (drained off) 515 g/l
S2 (crushed out) 503 g/l
S3 (dried) 239 g/l.

The following factors are also determined for better comparison:

F1: The volume factor is the quotient of the apparent density, drained off (S1) and the weight of the dry substance of one liter of the suspension. F1=S1/TS−S. In Example 1, F1=515/140=3.7. F2: The crush factor corresponds to the quotient of the apparent density crushed out (S2) and the weight of the dry substance of one liter of the suspension (TS−S). F2: S2/TS−S. In Example 1, F2=503/140=3.6.

F3: The swelling factor is a quotient of the apparent density, drained off (S1) and the weight of dry mass (TS(S1)) which is determined after all the water has been removed from the drained off control sample of one liter. F3=S1/TS(S1). In Example 1, F3=515/156=3.3.

The volume, crush and swelling factors should be at least 2, preferably at least 3 and most preferably at least 4. The upper limits of the above-mentioned factors are below about 20 and preferably below 15. Furthermore, the three factors of the same control sample should differ very little from each other, that is at most about 3 times, and preferably only about 2 times. The results for Example 1 are tabulated in Table 4.

1.2 Use of the carrier material in the biological treatment process (Ia)

A fixed bed volume of 1000 liters is filled to 75%, by volume, with the carrier material of Example 1.1 and a supply/discharge quantity of 250 liters/hour is set (see FIG. 1 and general description of process (Ia)).

After running time of 3 weeks, the following results are produced:

|  | present invention | without carrier (comparative experiment) |
|---|---|---|
| COD$_5$-decomposition | 41% | 8% |
| Toxicity of water-fleas | 1:200 - dilution | 1:5000 - dilution |
| Toxicity of fish | 1:10 - dilution | 1:24 - dilution |
| Threshold value of odor | 1:180 - dilution | 1:1000 - dilution |
| (Dilution with pure water) |  |  |

In this Example and in the subsequent Examples, the chemical oxygen demand is determined according to DIN 38 409 - part 41 (December 1980); the toxicity of fish is determined according to DIN 38 412 - part 15 f(June 1982); the toxicity of water fleas is determined according to DIN 38 412 - part 11 (October 1982); and the threshold value of odor is determined by the German unitary process for examining water, Loseblatt-collection, Edition 1982, Verlag Chemie-Weinheim.

| Transmission at | Lightening of color: | | | |
|---|---|---|---|---|
|  | 600 nm | 500 nm | 400 nm | |
| Result (%) | 95.5 | 91.5 | 75.0 | (present invention) |
| Result (%) | 76.0 | 67.5 | 47.0 | (without carrier) |

EXAMPLE 2

2.1 Carrier material:

Ampholytic (cation- and anion-containing) polyurethane(urea) composition which is filled with lignite is produced according to Example A2 from 41.66 parts by weight of true lignite having 52% residual moisture (20.0 parts by weight of dry substance of lignite) crushed to 200 μm, 10.0 parts by weight of cationic NCO-prepolymer KI-PP-A (as in Example 1).

70.0 parts by weight of water, and 0.2 parts by weight of diaminosulphonate correspond to formula

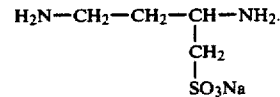

The carrier material contains in the solid material (moisture-free) about 66.2% by weight of lignite.

The granulated material is crushed to lumps of less than 12 mm in size. The solids content (TS−S) is 112 g/l of suspension suspended in water.

The apparent densities (g/l) are as follows:
Drained off: 645 g/l (S1),
Crushed out: 505 g/l (S2),
Dried: 349 (g/l) (S3).

2.2 Use of the carrier materials in the biological treatment process (Ia) (present invention)

Sewage treatment is carried out in a fixed bed under the conditions of Example (1).

Results after 3 weeks:

| Results after 3 weeks: | | | |
|---|---|---|---|
| | | present invention | without carrier composition (comparative experiment) |
| COD$_5$-decomposition | | 38% | 8% |
| Toxicity of water-fleas | | 1:900 | 1:500 - dilution |
| Threshold value of odor | | 1:1400 | 1:1000 - dilution |
| Color lightening: | | | |
| Transmission at | 600 nm | 500 nm | 400 nm |
| Result (%) | 87.0 | 80.5 | 57.0 | (present invention) |
| Result (%) | 50.0 | 37.5 | 20.0 | (comparative Example) |

EXAMPLE 3

Carrier material consisting of cationic polyurethane(urea) having 66.6%, by weight, of common sand as filler According to the general process (Example A2), a cationic polyurethane(urea) is produced from 10 parts of isocyanate-prepolymer KI-PP-A, 20 parts of common sand (fineness modulus of less than 300 μm), and 70 parts by weight of water. The resulting granulated material is crushed to less than 12 mm in size. The solids content is 125 mg/l of suspension; the apparent densities (S1): 728 g/l (drained off); S2): 620 g/l (crushed out); S3): 406 g/l (dried). The carrier material is used in a fluidized bed apparatus (treatment process (Ib)), as described in Example 4. The carrier composition according to Example 3 settles (unlike comparative Example 5) and may thus be used in either a fixed bed or fluidized bed process. The use of common sand as the sole filler has, however, only a limited effect, with regard to the effects in the biological sewage treatment. Good results may be achieved if some of the common sand is substituted by hydrophilic fillers, such as lignite (c.f. Example 4).

EXAMPLE 4

Carrier material consisting of cationic polyurethane(urea) having 33.3%, by weight, of common sand and 33%, by weight of lignite dust (based on dry substance).

The process is carried out as in Example 3, except that 10 parts of common sand are removed and 22.5 parts of lignite dust having 11% residual moisture are substituted therefor. The granulated material which has been crushed to lumps of less than 12 mm in size has a solids content TS−S of 84.5 g/l of suspension. The apparent densities are: (S1): 645 g/l; (S2): 566 g/l; S3): 302 g/l) the water absorbability WHF=91.7% and the swelling factor F3 is 5.6.

Use of the carrier materials of Examples 3 and 4 in the biological treatment process Ia (fixed-bed method)

The volume is 100 liters, which is filled to 75% by volume with the above-mentioned carrier materials. Supply and discharge is 25 liters/hour.

The biological results are compiled in the following Table:

| | Example | | Comparison in the absence of carrier material |
|---|---|---|---|
| | 3 | 4 | |
| COD$_5$-decomposition | 24 | 35 | 9 |
| Toxicity of water-fleas at dilution of | 1:3000 | 1:450 | 1:3300 |
| Threshold value of odor at a dilution of | 1:900 | 1:290 | 1:950 |
| Color lightening: Transmission at | 600 nm | | 500 nm | | 400 nm | |
| Example | 3 | 4 | 3 | 4 | 3 | 4 |
| Result | 79 | 90 | 69 | 85 | 55 | 68 |
| Comparison in the absence of carrier | 76 | | 67 | | 52 | |

EXAMPLE 5

Comparative Experiment to Examples 1 to 4 -not present invention 5.1 Carrier material:

A cationic polyurethane(urea) is produced from isocyanate prepolymer KI-PP-A in the absence of filler (15 parts of NCO prepolymer KI-PP-A and 85 parts of water). The resulting granulated material is crushed to less than 12 mm.

5.2 Biological sewage treatment process:

The material according to Example 5 (Comparison) has to be used in a mixing apparatus (treatment process II/FIG. 2), as this carrier material floats in a fixed bed apparatus even after weeks. This material simply cannot be used in a fluidized bed apparatus according to process (Ib).

The solids content TS−S (g/l of suspension) of Example 5—granulated material is 36 g/l, the apparent densities: S1: 520 g/l (drained off); S2: 490 g/l (crushed out) and S3: 219 g/l (dried).

EXAMPLE 6

6.1 Carrier material:

A cationic polyurethane(urea) composition, filled with 50% by weight of lignite dust and 25% by weight (based on dry substance) of black peat was produced according to Example A2.

22.47 parts by weight of lignite having 11% residual moisture (corresponding to 20 parts by weight of lignite—dry substance) in crushed form (less than 100 μm), 12.35 parts by weight of black peat having 19% residual moisture (corresponding to 10 parts by weight of black peat-dry substance), having a fiber proportion of 8% by weight, crushed to less than 200 μm, are reacted with 10 parts by weight of a mixture of the cationic prepolymer KI-PP-B and the non-ionic NCO-prepolymer O-PP-H in a weight ratio of 3:2, (the mixture containing 4.5% by weight of NCO) and 55.3 parts by weight of water. The resulting, highly-filled polyurethane(urea) carrier is crushed to produce granulated material with lumps of less than 200 mm. Suspended in water, the solid content TS—S is 108 g/l, the apparent densities are:
Drained off: 586 g/l, (S1)
Crushed out: 412 g/l, (S2)
Dried: 158 g/l, (S3)

6.2 Biological treatment process according to Ia and Ib

The filler-containing polyurethane(urea) carrier is used in a fixed bed during the first 4 weeks according to process (Ia) and then in a fluidized bed during the subsequent 4 weeks in process (Ib). The volume is 100 liters, 75% by volume are filled with the above-mentioned carrier material. The supply/discharge is 25 liters/hour. The results are compiled in the following Table:

| Treatment process | Present invention | | Comparison in the absence of carrier material |
|---|---|---|---|
| | Ia fixed bed | Ib fluidized bed | |
| COD$_5$-decomposition | 39% | 36% | 5% |
| Toxicity of water-fleas | 1:140 | 1:160 | 1:3500 |
| Threshold value of odor | 1:180 | 1:200 | 1:1000 |

| | Color lightening: | | | | | |
|---|---|---|---|---|---|---|
| Transmission at | 600 nm | | 500 nm | | 400 nm | |
| | Ia | Ib | Ia | Ib | Ia | Ib |
| Result (present invention) | 87.5% | 93.5% | 81.0% | 88.0% | 61.0% | 68.0% |
| Result (comparison without carrier material) | 50.0% | 64.5% | 37.5% | 53.0% | 20.5% | 31.5% |

If the lignite dust containing 11% residual moisture is substituted by a corresponding quantity of completely dried lignite dust (less than 1% by weight of water), virtually identical results are achieved in the above sewage treatment process. Therefore, it is unnecessary in practice to carry out a drying process of this type for lignite dust. Re-swelling and wetting of completely dried lignite dusts is time-consuming and technically difficult.

EXAMPLE 7

Cationic polyurethane(urea) composition, which is filled with 40% by weight of peat and 28% by weight of anthracite dust A cationic polyurethane(urea) composition was prepared according to Example A2 from 12.3 parts by weight of peat, as in Example 6 (10% by weight of moisture-free black peat), 7 parts by weight of anthracite dust which has been crushed to less than 90 μm, 8 parts by weight of the cationic NCO-prepolymer mixture of Example 6.1 (4.5% NCO) and 73 parts by weight of water. The product was crushed to produce granulated material of less than 12 mm. Suspended in water, the solids content is 87 g/l. Apparent densities are:
Drained off: 538 g/l (S1),
Crushed out: 408 g/l (S2),
Dried: 172 g/l (S3).

The use thereof in the biological treatment process (Ia):

A fixed bed volume of 100 liters is filled to 70% by volume with the above carrier material and the supply and discharge is 25 liters/hour. The results over a period of 4 weeks are:

| | present invention | Comparison without carrier material |
|---|---|---|
| COD$_5$-decomposition | 36% | 9% |
| Toxicity of water-fleas | 1:300 | 1:2500 - dilution |
| Threshold value of odor | 1:450 | 1:960 - dilution |

| | Color lightening: | | | |
|---|---|---|---|---|
| Transmission at | 600 nm | 500 nm | 400 nm | |
| Result | 96% | 90% | 74% | (present invention) |
| Result | 87% | 79% | 57% | (Comparative example without carrier) |

EXAMPLE 8

8.1 Carrier material: cationic polyurethane(urea) compositions having 50% by weight of black peat (dry mass):

A cationic polyurethane composition consisting of 24.7 parts by weight of black peat as in Example 6 (corresponding to 20 parts by weight of moisture-free black peat), 20 parts by weight of cationic NCO-prepolymer KO-PP-E (hydrophobic NCO-prepolymer having 5.9% by weight of NCO) and 56.3 parts by weight of water are reacted according to Example A2 to produce highly-filled carrier material which was then granulated to less than 12 mm. Suspended in water, the solids content is 69.3 g/l. The apparent densities are:
Drained off: 397 g/l (S1),
Crushed out: 377 g/l (S2),
Dried: 140 g/l (S3).

8.2 The use thereof in the biological treatment process (Ia)

A fixed bed volume of 100 liters is filled to 75% by volume with the above-mentioned carrier material; the supply/discharge is 25 liters/hour. The results over a period of 4 weeks are:

| | Present invention | Comparison without carrier material |
|---|---|---|
| COD$_5$-decomposition | 35% | 7% |
| Toxicity of water-fleas | 1:500 | 1:4000 - dilution |
| Threshold value of odor | 1:867 | 1:345 - dilution |

| | Color lightening: | | |
|---|---|---|---|
| Transmission at | 600 nm | 500 nm | 400 nm |
| Result (present invention) | 94% | 87% | 73% |
| Result (Comparative Example without carrier) | 83% | 76% | 53% |

EXAMPLES 9 TO 21

Highly-filled slowly-settling polyurethane(urea) composition consisting of polyurethane flexible and rigid foam wastes, further fillers and NCO-compounds 1. Characteristics of the foams which are used as fillers in the Examples.

(a) Flexible foams

Mixture of various bulk densities (from about 15 to 110 kg/m$^3$) from large-scale polyetherpolyurethane block and molding foam production are used in the three flexible foams WSB 14 and 90 and WSF-61.

WBS-14:

The dry bulk density of the flexible foam which substantially consists of block foam waste is about 14 grams/liters. Particle size is from 1 mm to 20 mm. Apparent densities after suspension in water S1: 263 g/l; S2: 101 g/l; S3: 14 g/l; TS−S (solid content in water suspension): 12.5 g/l of suspension.

WSF-61:

Molded flexible foam waste having a large quantity of crust (tough outer skin), apparent densities S1: 365 g/l; S2: 199 g/l; S3: 61 g/l; TS−S 51.7 g/l of suspension.

WSB-90:

Block flexible foam waste; particle size is from 1 to 12 mm, apparent densities S1: 365 g/l; S2: 199 g/l S3: 40 g/l; TS−S 35 g/l of suspension.

(b) Block rigid foam waste

HSB-65

The apparent densities of the granulated material which has a particle size of less than 2 mm and consists of block rigid foam waste is: S1: 896 g/l; S2: 457 g/l; S3: 65 g/l.

2. Comparative attempts with unmodified foams:

Polyurethane foams which are not bound with polyurethane(urea) precursors are completely useless in practice in biological sewage treatment as the foams float on the surface (c.f. Table 2). In a further comparative experiment in a mixing apparatus with relatively high-density flexible foam (apparent density 36 g/l; bulk density 90 g/l), (which has been crushed to less than 12 mm in size), most of the material immediately floated even after 3 months of storage in water when the mixing action was interrupted for a short period of time. It was impossible to use a fluidized bed with this foam. Rigid polyurethane foam-granulates are likewise unsuitable as they float, are too brittle and cause abrasion.

If active carbon powder is introduced into the aqueous suspension of the foams (WBS-14, WSF-61, WSB-90 and HSB-65), experiments show that this is not bound by the foam. Active carbon may be crushed into moist foam under certain conditions but on suspension in water, the active carbon is rinsed out to a large extent.

3. Production of the present carrier material

The highly-filled polyurethane(urea) compositions which are used in Examples 9 to 21 are produced at room temperature either in an intensive mixer which consists of a cylindrical container which is fixed to a rotatable plate and is equipped with a mixing device which may be introduced in an eccentric manner and which runs in the opposite direction to the rotation of the plate, or horizontally-mounted mixers are used which are equipped with blade-like tools.

The crushed polyurethane foam-waste and the required quantity of water are introduced and then the filler, (such as lignite), is uniformly mixed in. The NCO-prepolymer is then metered in a fine stream using a gear pump. Finally the catalyst K is optionally added (in the form of an aqueous emulsion which has been diluted 20 times). Stirring is stopped after several minutes, after all the constituents have been mixed in. The carrier material is then spread in a 10 cm deep layer for about 10 to 90 minutes until the isocyanate reactions are substantially finished.

The carrier material may be crushed and is washed several times with water and may then be directly or at some later point be used for the biological treatment according to the present invention.

The composition of the carriers according to Examples 9 to 23 are compiled in table 2.

4. Results of the tests for the usability of the carriers according to Examples 9 to 21 are shown in Table 3.

A series of measured values of carriers according to Examples 1 to 23 are compiled in Table 4.

Carrier Material

EXAMPLES 22 AND 23

Instructions for continuous production (not according to the invention)

Composition - see table 2.

The apparatus used is a double-blade spiral screw trough with a capacity of about 180 l and a length of about 300 cm, the blade shafts of which rotate in opposite directions to each other. The product is automatically conveyed from the feed inlet towards the discharge outlet, the reaction mixture being kneaded or crushed to a certain extent between the blade shafts. The polyurethane foam comminuted to below 12 mm or to below 25 mm and the lignite dust are fed separately into the spiral trough via metering screws. At the same point the water is introduced by means of piston pumps and the NCO prepolymer by means of gear pumps. It is recommendable, but not absolutely necessary, to intensively mix the cationic NCO prepolymer with about 10 times the amount of water, having a temperature of about 10° to 25° C., in a pipeline mixer or a static mixer for a few seconds, since, by doing so, the pre-dried lignite dust is moistened extremely quickly and uniformly with the separately introduced remaining quantity of water heated to 50° C. and the NCO prepolymers envelop the solids and foams uniformly and in a very finely dispersed form.

After a residence time in the spiral trough of 2—3 minutes the product is discharged, through an opening situated underneath the end of the trough, into containers which are half-filled with water, and, after about 2 hours or at a later time, washed with water.

TABLE 2

Composition of the highly-filled polyurethane(urea) carrier compositions of Examples 9 to 21

| Patent Examples | Filler Waste from | | | Filler Others | | Filler Mesh size (μm) | NCO—Prepolymer | | |
|---|---|---|---|---|---|---|---|---|---|
| | Quantity | Type | Mesh size (μm) | Quantity | Type | | Quantity | Type | % NCO |
| 9 | 5 | WSB-14 | 20 | 6 | BKK | 100 | 3.5 | KI-PP-A | 5.1 |
| | | | | 5 | TDIR | | 1.5 | I-PP-D | 4.9 |
| 10 | 7.5 | WSB-14 | 12 | 10 | BK | 100 | 3.5 | KO-PP-E | 5.9 |
| 11 | 5 | WSB-14 | 20 | 5 | BK | 90 | 6 | KO-PP-F | 3.2 |
| | | | | 5 | BKK | | | | |

TABLE 2-continued

Composition of the highly-filled polyurethane(urea) carrier compositions of Examples 9 to 21

| 12 | 20  | WSF-61 | 12 | 10 | BK | 100 | 3.5 | KIO-PP-B | 5.3 |
|----|-----|--------|----|----|----|-----|-----|----------|-----|
|    |     |        |    |    |    |     | 1.5 | O-PP-H   |     |
| 13 | 7   | WSB-14 | 12 | 7  | AK | 30  | 5   | KI-PP-A  | 5.1 |
| 14 | 7.5 | WSB-90 | 12 |    | —  |     | 5   | KI-PP-A  | 5.1 |
|    |     |        |    |    |    |     | 2.5 | I-PP-D   | 4.9 |
| 15 | 7.5 | WSB-14 | 12 |    |    |     | 3.0 | KI-PP-A  | 5.1 |
| 16 | 3.5 | HSB-65 | 2  | 25 | BK | 100 | 20  | KO-PP-F  | 3.2 |
| 17 | 10  | WSB-14 | 12 | 10 | BK | 100 | 4   | KI-PP-A  | 5.1 |
|    |     |        |    |    |    |     | 4   | I-PP-D   | 4.9 |
| 18 | 7   | WSB-14 | 12 | 10 | BK | 100 | 5   | KI-PP-A  | 5.1 |
| 19 | 10  | WSB-14 | 12 | 5  | BK | 100 | 5   | KI-PP-C  | 5.6 |
| 20 | 10  | WSB-14 | 6  | 10 | BK | 100 | 4   | KO-PP-E  | 5.9 |
| 21 | 4.5 | WSB-14 | 12 | 11 | SK | 90  | 3.5 | KI-PP-A  | 5.1 |
| 22 | 7.5 | WSB-14 | 25 | 15 | BK | 100 | 7.5 | KO-PP-E  | 5.9 |
| 23 | 7.5 | WSB-14 | 12 | 15 | BK | 100 | 8.5 | KO-PP-E  | 5.9 |

| Patent Examples | Quantity of water | Addition Quantity | Addition Type | Dry Substance (g/l) Suspension (TS-S) | Apparent density g/l drained off S-1 | Apparent density g/l crushed out S-2 | Apparent density g/l dried S-3 |
|---|---|---|---|---|---|---|---|
| 9  | 79   | —   | —   | 79    | 448 | 306 | 87  |
| 10 | 79   |     | K   | 44    | 528 | 200 | 66  |
| 11 | 79   |     | K   | 85    | 470 | 295 | 84  |
| 12 | 65   | —   | —   | 110   | 581 | 328 | 100 |
| 13 | 81   | —   | —   | 65    | 471 | 201 | 66  |
| 14 | 85   | —   | —   | 60    | 579 | 479 | 131 |
| 15 | 84.5 | 5   | Fe 1| 40    | 514 | 124 | 31  |
| 16 | 50   | 1.5 | SIG | 112   | 581 | 328 | 151 |
| 17 | 72   | —   | —   | 58    | 610 | 428 | 86  |
| 18 | 76   | 2   | Fe 2| 74    | 631 | 346 | 90  |
| 19 | 78   | 2   | SIW | 56.8  | 632 | 234 | 67  |
| 20 | 76   |     | K   | 47    | 506 | 262 | 58  |
| 21 | 81   | —   | —   | 54    | 562 | 278 | 64  |
| 22 | 70   | —   | —   | 61    | 279 | 221 | 82  |
| 23 | 70   | —   | —   | 59    | 346 | 232 | 83  |

Quantities are given in parts by weight, in each case based on solid substance.
K = 0.5% by weight of dibutyl tin dilaurate, based on NCO—prepolymer quantity
BK = lignite - true (in parts by weight of dry substance)
BKK = lignite coke
AK = active carbon
SK = mineral coal (anthracite dust)
TDIR = TDI-sump residue which has been crushed to 200 μm and allowed to settle in water
Fe 1 = ferromagnetic iron oxide ($fe_3O_4$), particle size about 1 μm
Fe 2 = iron oxide pigment ($fe_2O_3$), particle size about 1 μm
SIG = silica sol, 30% in water, specific surface 200 $m^2/g$
SIW = water glass, 10% solution having 5% by weight of phosphoric acid, added pre-gelled
I = nonionic, hydrophilic NCO—prepolymer
KO = cationic hydrophobic NCO—prepolymer
K(O) = cation-forming hydrophobic NCO—prepolymer

TABLE 3

| Example | Biolog. Treatment method | Volume of various apparatus (liters) | Filling vol. % | $COD_5$ decomp. | Toxicity of water fleas diluted x-times | Odor threshold value | Color lightening (nm) 600 | Color lightening (nm) 500 | Color lightening (nm) 400 |
|---|---|---|---|---|---|---|---|---|---|
| 9  | Ia | 100   | 75 | 36/9 | 600/2800  | 250/880 | 94/82 | 88/76 | 69/54 |
| 10 | Ib | 1,000 | 75 | 41/9 | 200/2800  | 210/880 | 96/82 | 89/76 | 78/54 |
| 11 | Ia | 100   | 75 | 37/8 | 400/3300  | 240/950 | 93/76 | 85/67 | 71/52 |
| 12 | Ia | 100   | 75 | 35/8 | 300/3300  | 200/950 | 95/76 | 87/67 | 69/52 |
| 13 | Ib | 100   | 75 | 34/8 | 290/3300  | 220/950 | 93/76 | 87/67 | 66/52 |
| 14 | II | 30    | 75 | 21/8 | 1800/3300 | 800/950 | 82/76 | 71/62 | 54/52 |
| 15 | Ib | 100   | 75 | 27/8 | 1400/3300 | 650/950 | 85/76 | 77/67 | 58/52 |
| 16 | Ib | 100   | 75 | 43/8 | 270/3300  | 230/950 | 95/76 | 87/67 | 76/52 |
| 17 | Ib | 100   | 50 | 38/9 | 320/2800  | 220/880 | 89/82 | 85/76 | 64/54 |
| 18 | Ib | 100   | 50 | 40/9 | 290/2800  | 230/880 | 88/82 | 84/76 | 65/54 |
| 19 | Ia | 100   | 40 | 35/9 | 340/2800  | 245/880 | 87/82 | 83/76 | 65/54 |
| 20 | Ib | 100   | 75 | 39/9 | 295/2800  | 250/880 | 87/82 | 84/76 | 64/54 |

TABLE 3-continued

| Example | Biolog. Treatment method | Volume of various apparatus (liters) | Filling vol. % | COD5 decomp. | Toxicity of water fleas diluted x-times | Odor threshold value | Color lightening (nm) 600 | 500 | 400 |
|---|---|---|---|---|---|---|---|---|---|
| 21 | Ib | 100 | 75 | 28/9 | 1200/2800 | 590/880 | 86/82 | 78/76 | 58/54 |

Figure 3A:
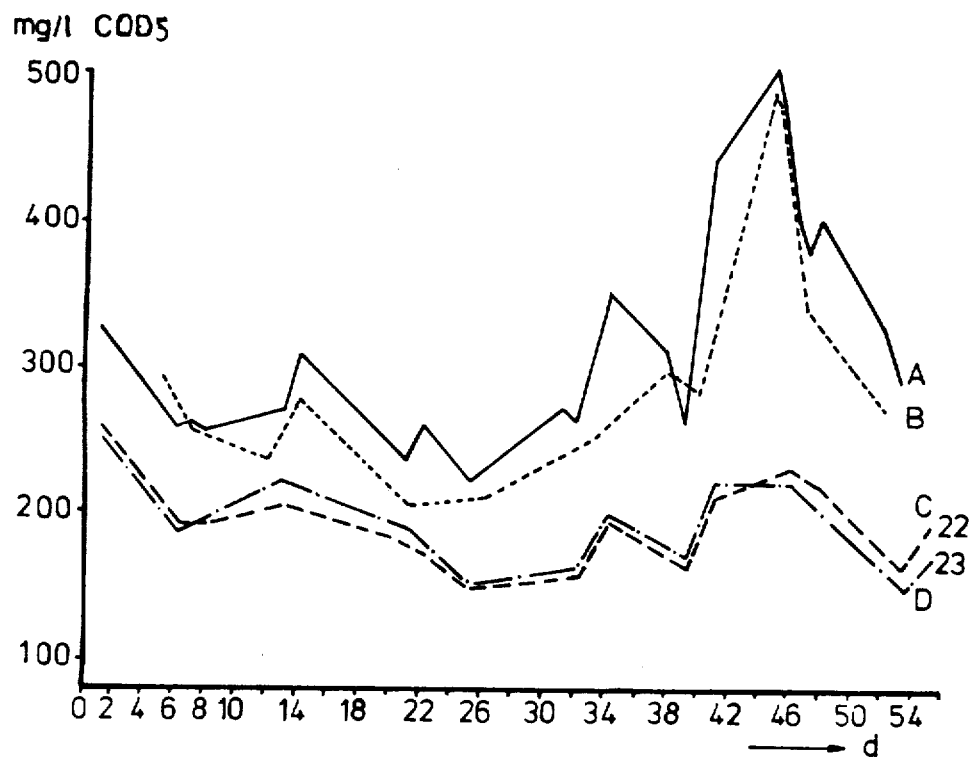
FIG. 3 shows the effect of sewage treatment with the carriers of the present invention.

In the last six columns, the results before the stroke are those using the polyurethane(urea) carrier compositions of the present invention and those to the right of the stroke are the results of the parallel experiments in the absence of carrier.
The results of Examples 9 to 18 were taken after 4 weeks of the compositions in the sewage treatment tanks and those of Example 14 were taken after 10 weeks. The average period of residence of the water to be treated is 4 hours.
The results obtained with the substances according to Examples 22 and 23 of the biological sewage purification over a running period of 57 days (d) are given in FIGS. 3a and 3b.
In FIG. 3a:
curve A signifies the starting point COD5 (in mg/l), i.e. the COD value at the inlet of the purification stage (the outlet of the 1st activating stage of a large-scale plan which had been charged with chemical effluents is taken as the inlet),
curve B shows the COD5 values of the blank experiment for carriers according to the invention,
curve C shows the COD5 values using carrier compositions according to Example 22,
curve D shows the COD5 values according to Example 23.

Figure 3B:
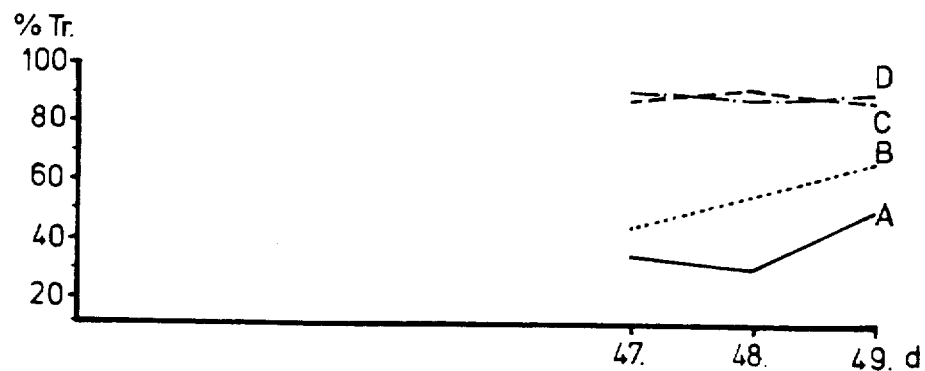

In each of curves B, C and D the COD5 values of the effluent after a residence time of 4 hours in the purifications stage, are shown. In FIG. 3*b* the lightening of the brown colouration is shown as the transmission (Tr) at 600 nm (in %) for the 47th, 48th and 49th day (d).

TABLE 4

| Volume, crushing and swelling factors of the highly filled polyurethane(urea) carrier compositions. | | | | | |
|---|---|---|---|---|---|
| F1 Volume factor | F2 crushing factor | F3 swelling factor | F4 suspension factor | % WAF water absorption | % FKS Solids content |

| Example | | | | | | |
|---|---|---|---|---|---|---|
| 1 | 3.7 | 3.6 | 3.3 | 7.2 | 86.1 | 13.9 |
| 2 | 5.8 | 4.5 | 4.4 | 9.1 | 89.0 | 10.9 |
| 3 | 5.8 | 5.0 | 4.8 | 8.2 | 87.8 | 12.2 |
| 4 | 8.0 | 6.7 | 5.6 | 12.0 | 91.7 | 8.3 |
| 5 | 14.4 | 13.6 | 13.4 | 28.5 | 96.5 | 3.5 (comparison) |
| 6 | 5.4 | 4.4 | 4.9 | 9.5 | 89.5 | 10.5 |
| 7 | 6.2 | 4.7 | 6.0 | 11.6 | 91.4 | 8.6 |
| 8 | 5.4 | 5.4 | 3.8 | 14.5 | 93.1 | 6.9 |
| 9 | 5.7 | 3.9 | 5.9 | 13.2 | 92.4 | 7.6 |
| 10 | 12.0 | 4.5 | 6.5 | 22.9 | 95.6 | 4.4 |
| 11 | 5.5 | 3.5 | 5.1 | 12.0 | 91.7 | 8.3 |
| 12 | 5.3 | 3.1 | 4.5 | 9.2 | 89.1 | 12.9 |
| 13 | 7.3 | 3.1 | 4.8 | 15.7 | 93.6 | 6.4 |
| 14 | 9.7 | 8.2 | 8.4 | 16.9 | 94.1 | 5.9 |
| 15 | 13.0 | 3.1 | 8.3 | 25.2 | 96.1 | 3.9 |
| 16 | 3.6 | 3.4 | 3.1 | 7.0 | 88.9 | 11.1 |
| 17 | 10.5 | 7.4 | 5.6 | 17.4 | 94.3 | 5.7 |
| 18 | 8.5 | 4.7 | 6.3 | 13.7 | 92.7 | 7.3 |
| 19 | 11.1 | 4.1 | 6.5 | 17.7 | 94.4 | 5.6 |
| 20 | 10.7 | 6.1 | 6.1 | 21.3 | 95.3 | 4.7 |
| 21 | 10.4 | 5.1 | 6.1 | 18.7 | 94.7 | 5.3 |
| Average Value (without Comparative Example 5) | X = 7.7 | X = 4.7 | X = 5.5 | X = 14.2 | X = 92.0 | X = 8.0 |
| Upper and lower limit (without Comparative Example 5). | (3.6–13.0) | (3.1–8.2) | (3.1–8.4) | (7.2–25.2) | (86.1–95.6) | (3.9–13.9) |
| additional examples | | | | | | |
| 22 | 4,6 | 3,6 | 3,3 | 16,4 | 93,4 | 6,1 |
| 23 | 5,9 | 3,9 | 3,5 | 16,9 | 94,1 | 5,9 |

The difference in the % WAF-value (water absorbability) to 100 gives the percentage content (% FKS) in the suspension (without overlying water).
Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In the biological treatment of a wastecontaining liquid by the removal of organic matter by microorganisms, the improvement which comprises adding a carrier material for said microorganisms to said liquid in an amount of at least 0.5 grams per liter of said liquid, said carrier material comprising a non-floating, non-abrasive, filled polyurethane(urea) composition which (i) does not contain any cells capable of growth during the production thereof, (ii) has a filler content of from more than 15% by weight to about 95% by weight, based on the moisture-free weight of the filler-containing polyurethane(urea) composition, and (iii) has a water-absorbability of from more than 33% to about 97% by weight, said fillers used in said composition being selected from the group consisting of (i) natural materials containing finely-divided fossil lignocelluloses and the secondary products thereof, (ii) active carbon, (iii) cork powder, (iv) finely-divided organic distillation residues which melt above 100° C., (v) finely-divided inorganic fillers, (vi) homogeneous or cellular plastic particles, and (vii) mixtures thereof.

2. The process of claim 1 wherein said composition is a hydrophilic and/or hydrophobic polyurethane(urea) which contains cationic groups or groups capable of forming cationic groups.

3. The process of claim 1, wherein said filler is selected from the group consisting of natural materials containing finely-divided lignocelluloses or the secondary products thereof.

4. The process of claim 4, wherein said filler is finely-divided black peat and/or lignite dust.

5. The process of claim 1, wherein said filler is polyurethane foam particles having particle sizes of from 1 to 30 mm.

6. The process of claim 1, wherein said filler is a combination of finely-divided lignocelluloses and polyurethane foam particles.

7. The process of Claim 1, wherein said filler is a combination of finely-divided inorganic fillers, finely-divided lignocelluloses and polyurethane foam particles.

8. The process of claim 1, wherein said composition comprises a hydrophilic or hydrophobic polyurethane(urea) in an amount of from 5 to 85% by weight of the filler-containing carrier composition (as solid material).

9. The process of claim 8 wherein said composition is a hydrophobic, cationically modified polyurethane(urea) and wherein said filler is peat and/or lignite.

10. The process of claim 9, wherein said polyurethane(urea) contains cationic or cationic-forming groups in a quantity of from 10 to 3000 milliequivalents per kg of polyurethane(urea) and black peat and/or lignite and/or polyurethane foam particles are used as fillers.

11. The process of claim 10 wherein the polyol component used to produce said polyurethane(urea) contains less than 30% by weight of oxyethylene groups.

12. The process of claim 11 wherein said filler is selected from the group consisting of peat, lignite, polyurethane foam particles and mixtures thereof.

13. The process of claim 10, wherein the polyol component used to produce said polyurethane(urea) contains less than 20% by weight of oxyethylene groups.

14. The process of claim 1, wherein said carrier has a water-absorbability of from 50 to 97% by weight of water.

15. The process of claim 1, wherein said composition comprises hydrophobic polyurenthane(ureas) in an amount of from 5 to 85% by weight of the filler-containing carrier composition and that the polyurethane(urea) contains 10 to 3000 milliequivalents per kg of polyurethane(urea) cationic or cationic-forming groups, and the fillers are black peat, lignite or polyurethane foam particles or mixtures of those fillers.

* * * * *

UNITED STATES PATENT AND TRADEMARK OFFICE
CERTIFICATE OF CORRECTION

PATENT NO. : U. S. Patent 4,576,718
DATED : March 18, 1986
INVENTOR(S) : Artur Reischl and Kurt Mack It is certified that error appears in the above-identified patent and that said Letters Patent is hereby corrected as shown below:

At Column 9, line 67, after 10, µ was omitted.

At Column 11, line 41, insert --)-- after "compounds".

At Column 14, line 2, insert --.--.

At Column 14, line 25, insert a space between "sulphatereducing".

At Column 14, line 34, correct "sewaqe" to --sewage--.

At Column 15, line 25, correct "adJusted" to --adjusted--.

At Column 16, line 10, correct "particIes" to --particles--.

At Column 16, line 31, insert --.-- after enriched.

At Column 21, line 3, the formula should read:

$$F4 = SG/TS-S$$

At Column 23, line 23, correct "1:1400" to --1:140--.

At Column 31, line 64, correct "wastecontaining" to --waste-containing--.

At Column 33, line 12, Claim 4, correct the dependency to --Claim 1--.

At Column 34, lines 16 through 21, Claims 13 and 14 should be reversed.

Signed and Sealed this

Twenty-first Day of June, 1988

Attest:

DONALD J. QUIGG

Attesting Officer

Commissioner of Patents and Trademarks